(12) United States Patent
Nishibeppu et al.

(10) Patent No.: US 12,219,891 B2
(45) Date of Patent: Feb. 11, 2025

(54) AUTONOMOUS DRIVING SYSTEM

(71) Applicant: Yanmar Power Technology Co., Ltd., Osaka (JP)

(72) Inventors: Shinya Nishibeppu, Osaka (JP); Takuya Iwase, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 54 days.

(21) Appl. No.: 17/800,897

(22) PCT Filed: Jan. 28, 2021

(86) PCT No.: PCT/JP2021/003016
§ 371 (c)(1),
(2) Date: Aug. 18, 2022

(87) PCT Pub. No.: WO2021/166580
PCT Pub. Date: Aug. 26, 2021

(65) Prior Publication Data
US 2023/0083514 A1 Mar. 16, 2023

(30) Foreign Application Priority Data

Feb. 19, 2020 (JP) ................................. 2020-026686
Nov. 27, 2020 (JP) ................................. 2020-196765

(51) Int. Cl.
*A01B 69/00* (2006.01)
*B60W 60/00* (2020.01)
(Continued)

(52) U.S. Cl.
CPC ............. *A01B 69/00* (2013.01); *G05D 1/0011* (2013.01); *G05D 1/0088* (2013.01); *G05D 1/0238* (2013.01); *G05D 1/223* (2024.01); *G05D 1/2232* (2024.01); *G05D 1/2247* (2024.01); *B60W 60/007* (2020.02)

(58) Field of Classification Search
CPC .. G05D 1/0011; G05D 1/0088; G05D 1/0238; G05D 1/223; G05D 1/2232; G05D 1/2247; G05D 1/0055; B60W 60/007; G08C 17/02; G10L 13/00
See application file for complete search history.

(56) References Cited

U.S. PATENT DOCUMENTS

2016/0340867 A1* 11/2016 Matsuzaki ........... A01B 69/008

FOREIGN PATENT DOCUMENTS

| CN | 110198627 A | * | 9/2019 | ........... A01B 69/008 |
| EP | 3352036 B1 | * | 9/2020 | ........... G05D 1/0011 |

(Continued)

*Primary Examiner* — Michael J Zanelli
(74) *Attorney, Agent, or Firm* — Chris Mizumoto

(57) ABSTRACT

A remote controller including an emergency stop button that receives an emergency stop operation, a temporary stop button that receives a temporary stop operation, and a control unit that restarts the running of a tractor when a running restart operation is performed after the tractor has been temporary stopped, the running restart operation including a pressing operation for pressing the temporary stop button continuously for a first predetermined time and a release operation for releasing the pressing operation on the temporary stop button within a second predetermined time following the first predetermined time.

8 Claims, 14 Drawing Sheets

(51) Int. Cl.
    *G05D 1/00*           (2024.01)
    *G05D 1/223*         (2024.01)
    *G05D 1/224*        (2024.01)

(56)           References Cited

FOREIGN PATENT DOCUMENTS

| | | | | |
|---|---|---|---|---|
| JP | 2017200125 A | * | 11/2017 | ............... H04Q 9/00 |
| JP | 2018164438 A | * | 10/2018 | |
| JP | 2018166303 A | * | 10/2018 | |
| JP | 6779164 B2 | * | 11/2020 | |
| WO | WO-2019201594 A1 | * | 10/2019 | ............ B60W 50/00 |

\* cited by examiner

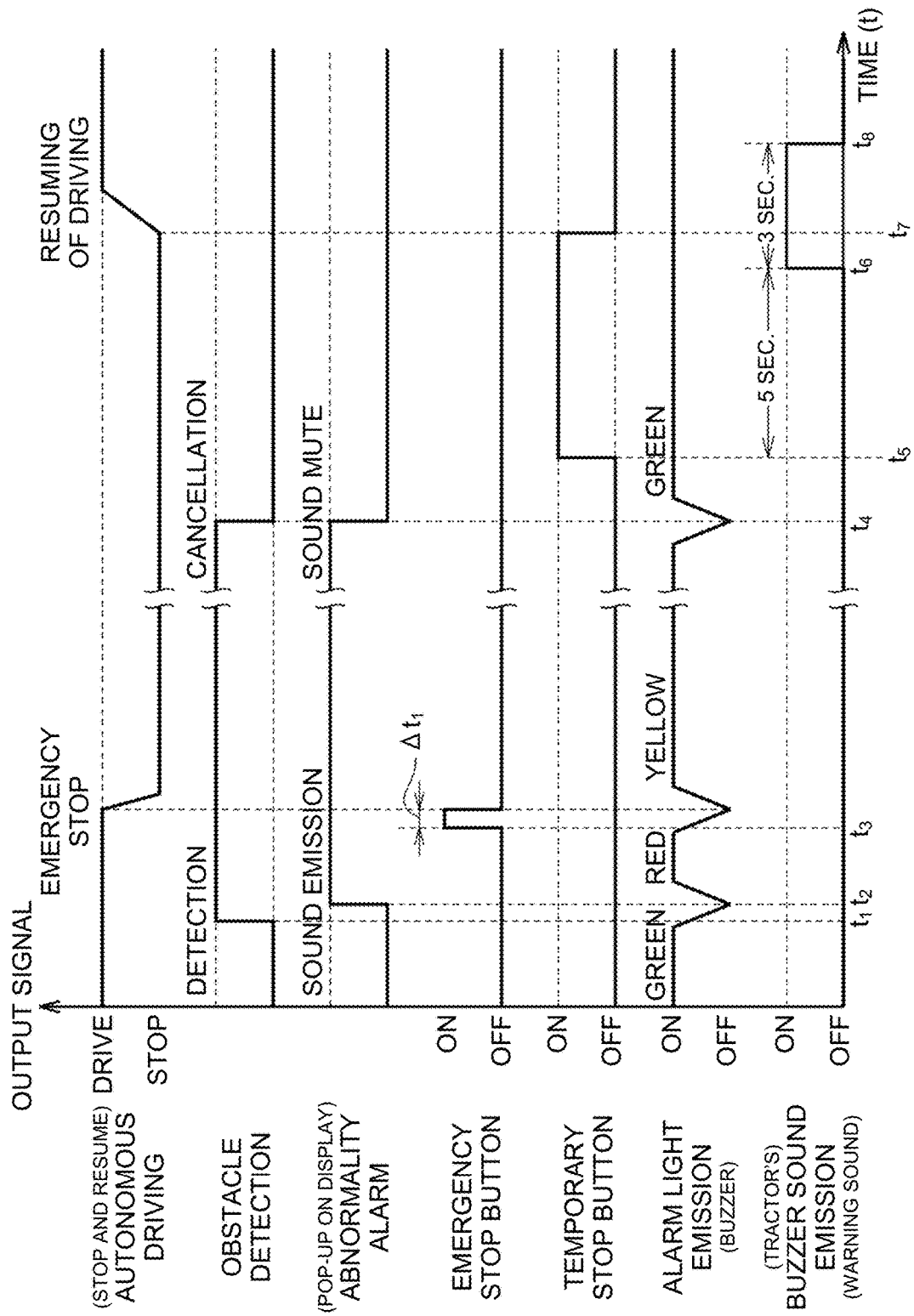

AUTONOMOUS DRIVING SYSTEM

CROSS-REFERENCE

This application is a US National Stage Application under 35 U.S.C. § 371 of International Application No. PCT/JP2021/003016 filed Jan. 28, 2021, which claims foreign priority of JP2020-026686 filed Feb. 19, 2020 and JP2020-196765 filed Nov. 27, 2020 and the disclosures of which are hereby incorporated by reference in their entirety.

TECHNICAL FIELD

The present invention relates to an autonomous driving system that can be operated and controlled with a high degree of safety even in a case of such a configuration where multiple remote controllers can be operated by multiple operators for a single work vehicle.

BACKGROUND ART

In recent years, in order to efficiently and easily perform agricultural work in a field or the like, autonomous driving systems have been developed to cause unmanned work vehicles without an operator on board to autonomously drive. Such autonomous driving systems are usually configured to make it possible to perform remote control of a work vehicle with a server device installed at a residence or the like that is away from the work vehicle.

However, with a system having such a configuration, it is not possible to visually check the driving and working states of a work vehicle such as a tractor, and thus handling at an emergency is difficult. For this reason, in order to operate autonomous driving of a work vehicle while checking images captured by a camera attached to the work vehicle on a screen of a remote control terminal such as a tablet that serves as a monitor, an autonomous driving system utilizing a remote control terminal equipped with a display screen that serves as the monitoring means has been developed.

Further, in a driving operation of a work vehicle with such remote control, in order to make it possible to safely stop the work vehicle even in a case where the remote control becomes disabled, there is a proposal that is equipped with the second remote control terminal such as a portable remote controller that can control the driving behavior of the work vehicle through communication with the work vehicle (specifically, capable of operations such as emergency stop) other than the first remote control terminal such as a tablet that sets the driving route and controls the behavior of the work vehicle through communication with the work vehicle, for example (see Patent Literature 1).

In the autonomous driving system described in this Patent Literature 1, an emergency stop button, a temporary stop button, and an automatic driving start button are installed on the remote controller, and it is possible to resume the driving of an emergently-stopped work vehicle with the automatic driving start button. There is also a proposal having a configuration with multiple second remote control terminals such as remote controllers, so that multiple operators working in the same field carry the second remote control terminals, respectively, so as to improve the monitoring system as well as improve safety in the field.

CITATION LIST

Patent Literature

Patent Literature 1: Japanese Unexamined Patent Application Publication No. 2018-191522

DISCLOSURE OF INVENTION

Problems to be Solved by the Invention

However, in the conventional autonomous driving systems, a button for resuming the driving is separately installed on a remote controller, and thus there is a problem that the size of the remote controller body is large. Since work vehicle capable of autonomous driving is to be operated by a remote control device and the remote controller for an emergency stop only has an appendant role, it is preferable that the remote controller is small.

The present invention is made in view of such a problem as described above, and the object thereof is to downsize the remote control terminal which provides an instruction related to driving to a work vehicle capable of autonomous driving and to provide an autonomous driving system in which the driving of the work vehicle can be resumed by the remote control terminal in a case where the work vehicle stops.

Means for Solving the Problems

The autonomous driving system according to the present invention is an autonomous driving system including a remote control terminal that provides an instruction related to driving to a work vehicle capable of autonomous driving. The remote control terminal includes: a switch part that accepts a stop operation which is to stop the work vehicle during the autonomous driving; and a control part that resumes the driving of the work vehicle in a case where, after the work vehicle stops in response to the stop operation performed to the switch part, a driving resuming operation, which includes a pressing operation which is to continuously press the switch part for a first predetermined period of time or more and a release operation which is to release the pressing operation performed to the switch part within a second predetermined period of time that follows the first predetermined period of time, is performed.

The autonomous driving system according to the present invention is an autonomous driving system including a remote control terminal that provides an instruction related to driving to a work vehicle capable of autonomous driving. The remote control terminal includes: a first switch part that accepts an emergency stop operation which is to emergently stop the work vehicle during the autonomous driving; a second switch part that accepts a temporary stop operation which is to temporarily stop the work vehicle during the autonomous driving; and a control part that resumes the driving of the work vehicle in a case where, after the work vehicle stops in response to a stop operation performed to the first switch part or the second switch part, a driving resuming operation in which the first switch part and the second switch part are both in a pressed state for a first predetermined period of time is performed.

Effect of the Invention

According to the present invention, it is possible to downsize the remote control terminal which provides an instruction related to driving to a work vehicle capable of autonomous driving and to realize an autonomous driving system in which the driving of the work vehicle can be resumed by the remote control terminal in a case where the work vehicle stops.

BRIEF DESCRIPTION OF DRAWINGS

FIG. 16 is a timing chart illustrating the behavior in the operation of resuming the tractor according to the second embodiment of the present invention.

DESCRIPTION OF EMBODIMENTS

Hereinafter, embodiments of the present invention will be explained with reference to the accompanying drawings.

First Embodiment

Before explaining the remote control device (hereinafter referred to as the RCD) according to the first embodiment of the present invention, first of all, an explanation of the robot tractor 1 (hereinafter may be simply referred to as the "tractor"), which is an example of a work vehicle according to the first embodiment of the present invention, will be given.

Figure 1:
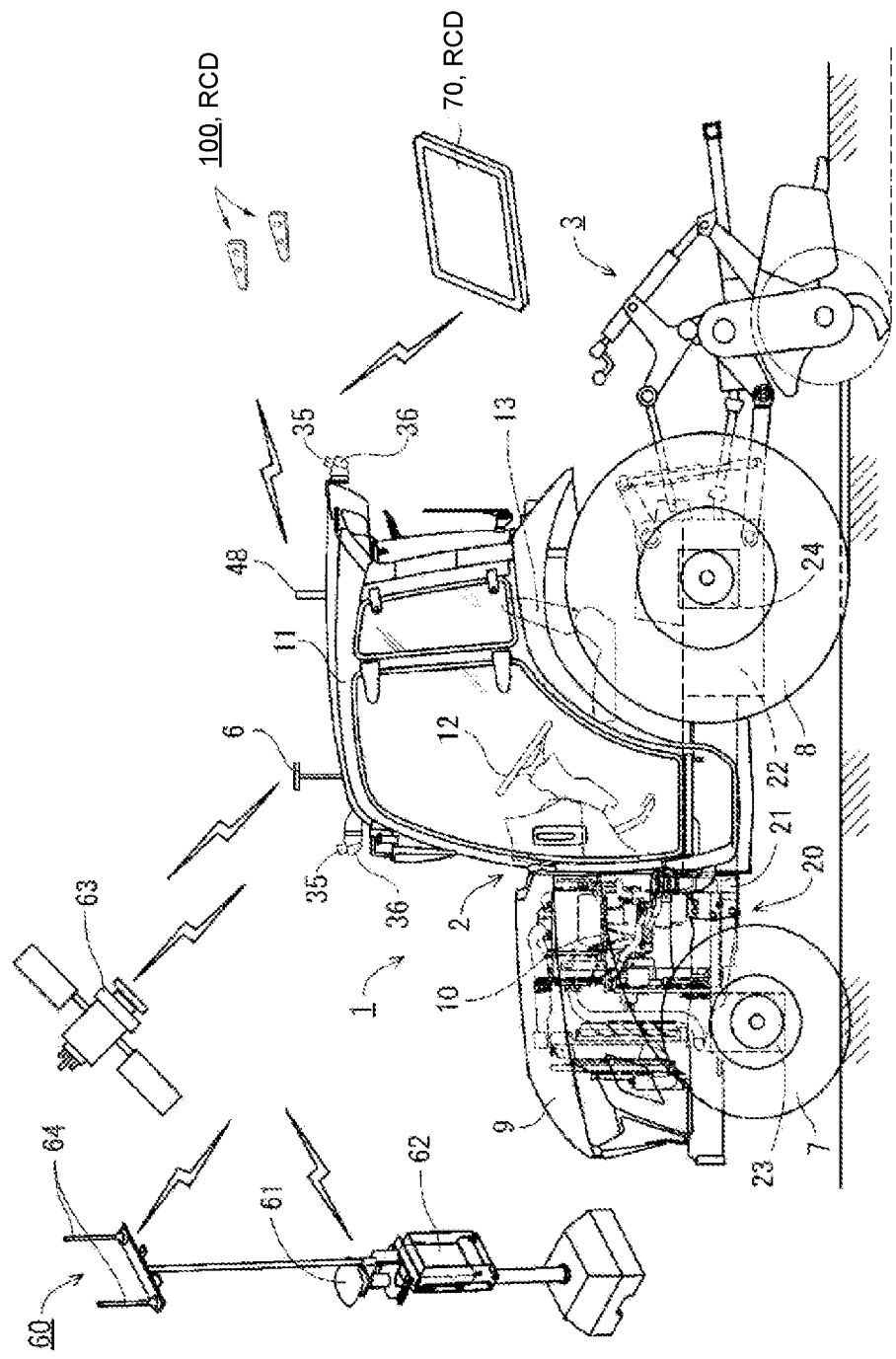
FIG. 1 is an overall side view of a robot tractor according to the first embodiment of the present invention.
Figure 2:
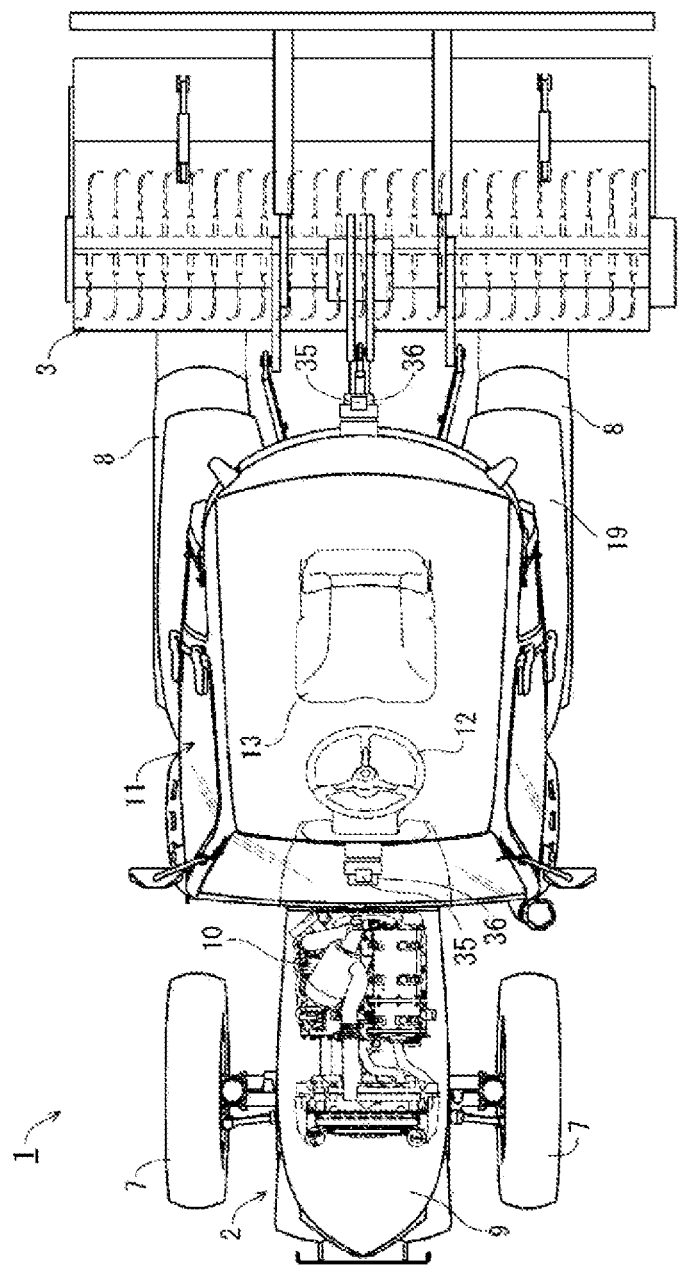
FIG. 2 is a plan view of the robot tractor according to the first embodiment of the present invention.

The tractor 1 of the present invention includes the machine body 2 that performs autonomous driving in a field. As illustrated in FIG. 1 and FIG. 2, the machine body 2 includes the work machine 3 to be used for agricultural work that can be attached and detached. Further, this machine body 2 is configured to be capable of changing the height and posture of the mounted work machine 3.

The work machine 3 of the present embodiment is used for agricultural work. As this work machine 3, for example, there are various work machines such as a tiller, plow, fertilizer applicator, mower, and seeder, and a work machine as desired according to the need can be selected from among these and mounted on the machine body 2.

Figure 3:
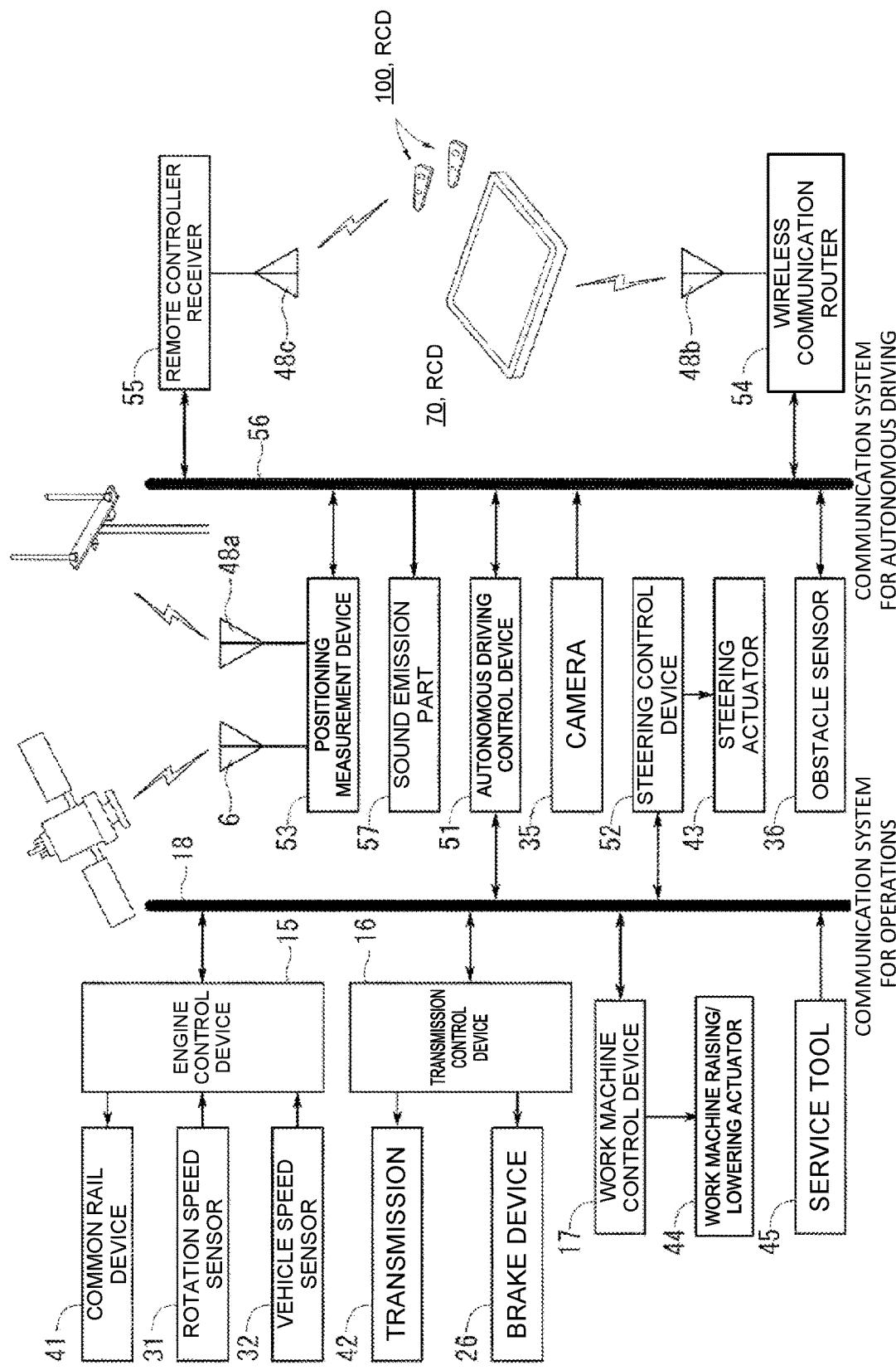
FIG. 3 is a functional block diagram of the robot tractor according to the first embodiment of the present invention.

Note that, in the present specification, as illustrated in FIG. 3, "autonomous driving" means that the autonomous driving control device 51, etc., included in the tractor 1 controls each device or apparatus included in this tractor 1 for driving, so that the tractor 1 performs driving along a predetermined route.

In the following explanation, a tractor that performs autonomous driving may be referred to as an "unmanned tractor" or "robot tractor" and a tractor that performs driving and work under a direct control by an operator may be referred to as a "manned tractor". In a case where a part of the agricultural work in a field is performed by an unmanned tractor, the remaining agricultural work is performed by a manned tractor.

In the present embodiment, the difference between an unmanned tractor and a manned tractor is the presence or absence of a direct control by an operator, and the configuration as a tractor is the same regarding both unmanned and manned tractors. In other words, even an unmanned tractor can be directly controlled by an operator on board (boarding the vehicle) (in other words, it can be used as a manned tractor). Further, if the operator gets off the vehicle, even a manned tractor can be made to perform autonomous driving and autonomous work (in other words, it can be used as an unmanned tractor).

With reference to FIG. 1 and FIG. 2, the configuration of the tractor 1 will be explained. As illustrated in FIG. 1, the front part of the machine body 2 of the tractor 1 is supported by the left-right pair of front wheels 7 and 7 and the rear part of the machine body 2 is supported by the left-right pair of rear wheels 8 and 8. The front wheels 7 and 7 and the rear wheels 8 and 8 configure the driving part.

In the front of the machine body 2, the hood 9 is arranged. In this hood 9, the engine 10 which is a drive source for the tractor 1 and a fuel tank (not illustrated in the drawings) are housed. Although this engine 10 can be configured of a diesel engine, for example, there is not a limitation as such, and it is also possible that the engine 10 is configured of a gasoline engine, for example. Further, in addition to or instead of the engine, an electric motor may be used as the drive source.

In the rear of the hood 9, the cabin 11 that an operator is to be aboard is arranged. Inside this cabin 11, the steering wheel 12 for allowing the operator to perform a steering operation, the seat 13 on which the operator can sit, and various operation devices for performing various kinds of operations are mainly installed. However, agricultural work vehicles are not limited to those with the cabin 11 and may also be those without the cabin 11.

Although illustration in the drawings is omitted, the examples of the above-described operation devices include, for example, a monitor device, throttle lever, main gear-shift lever, raising/lowering lever, PTO switch, PTO gear-shift lever, and multiple hydraulic gear-shift levers, etc. These operation devices are arranged in the vicinity of the seat 13 or in the vicinity of the steering wheel 12.

The monitor device is configured to be capable of displaying various kinds of information of the tractor 1. The throttle lever is for setting the rotation speed of the engine 10. The main gear-shift lever is for performing an operation of changing the gear ratios of the transmission case 22. The raising/lowering lever is for performing an operation of raising or lowering the height of the work machine 3 mounted on the machine body 2 within the predetermined range. The PTO switch is for performing an operation of connecting or disconnecting the power transmission to the PTO shaft (power take-off shaft) protruding outward from the rear end of the transmission case 22. In other words, whereas the power is transmitted to the PTO shaft and the PTO shaft rotates so that the work machine 3 is driven when the PTO switch is in the ON state, the power to the PTO shaft is cut off and the PTO shaft does not rotate so that the work machine 3 stops when the PTO switch is in the OFF state. The PTO gear-shift lever is for performing an operation of changing the power to be input to the work machine 3 and specifically for performing an operation of changing the rotation speed of the PTO shaft. The hydraulic gear-shift lever is for performing an operation of switching the hydraulic external take-off valve.

As illustrated in FIG. 1, the chassis 20 which configures the framework of the machine body 2 is installed in the lower part of the machine body 2. The chassis 20 is configured with the machine body frame 21, the transmission case 22, the front axle 23, the rear axle 24, etc.

As illustrated in FIG. 3, the tractor 1 includes the engine control device 15, the transmission control device 16, and the work machine control device 17, which are capable of performing mutual communication via the vehicle bus line 18, as the control part for controlling the behavior of the machine body 2 (forward traveling, backward traveling, stopping, turning, etc.) and the behavior of the work machine 3 (raising/lowering, driving, stopping, etc.). The engine control device 15 is electrically connected to the common rail device 41, which is a fuel injection device installed in the engine 10, and the transmission control device 16 is electrically connected to the transmission 42, which includes a hydraulic gear-shift device or the like for shifting gears of the power from engine 10. Further, the work machine control device 17 is electrically connected to the work machine raising/lowering actuator 44.

Specifically, for example, the transmission 42 is a movable swash plate type hydraulic continuously-variable gear-shift device and is installed in the transmission case 22. By controlling the transmission 42 with the control device 4 and adjusting the angle of the swash plate appropriately, the gear ratio of the transmission case 22 can be set to the desired gear ratio.

Further, to the engine control device 15, a group of sensors such as the rotation speed sensor 31 for detecting the rotation speed of the engine 10, the vehicle speed sensor 32 for detecting the rotation speed of the rear wheels 8, and a steering angle sensor (illustration in the drawings is omitted) for detecting the rotational angle (steering angle) of the wheel 12 is electrically connected. The detection values of these sensors are converted into detection signals and sent to the engine control device 15.

The tractor 1 including the control devices 15 to 17 as described above is configured to be capable of executing agricultural work while driving in a field with the control devices 15 to 17 performing mutual communication via the vehicle bus line 18 based on various kinds of operations by the operator on board inside the cabin 11 and controlling each part (machine body 2, work machine 3, etc.) of the tractor 1. In addition, the tractor 1 in the present embodiment includes the remote control device RCD so that autonomous driving can be performed by remote control without an operator on board, for example.

Note that the remote control device RCD of the present invention is configured with the single first remote control terminal 70 (hereinafter may be referred to as the "tablet 70") and the single or multiple (in the case of the present embodiment, two) second remote control terminals 100 (hereinafter referred to as the "remote controllers 100"), and the autonomous driving can be performed based on predetermined control signals that are output from these remote control devices RCD. Note that, for clearly identifying these two remote controllers 100, the two remote controllers 100 may be referred to as the first remote controller 100A and the second remote controller 100B.

The first remote control terminal 70 is configured as a tablet-type personal computer, for example. In the present embodiment, a user who operates a manned tractor get aboard the manned tractor with the first remote control terminal 70 and sets the first remote control device on an appropriate support part in the manned tractor for operations, for example. Alternatively, a user different from the operator who operates the manned tractor performs an operation of generating a driving route with the first remote control terminal 70 outside the tractor. The user is able to refer to and check information (e.g., information from the various sensors attached to the robot tractor 1) displayed on the display 71 of the first remote control terminal 70. Further, the user is able to send control signals for controlling the tractor 1 to the control part of the tractor 1 by operating a hardware key arranged in the vicinity of the display 71, a touch panel arranged on the display 71, etc. Here, although it is assumed that the control signals that the first remote control terminal outputs to the control part of tractor 1 include signals related to the route of autonomous driving and autonomous work as well as start signals, end signals, emergency stop signals, temporary stop signals, and resume signals after a temporary stop in autonomous driving and autonomous work, there is not a limitation as such.

Specifically, as illustrated in FIG. 3, various kinds of configurations such as the autonomous driving control device 51 for enabling this tractor 1 to perform autonomous driving are added. Furthermore, the tractor 1 includes various kinds of configurations such as the positioning antenna 6, which is necessary to obtain position information of itself (the machine body) based on a positioning system. With such a configuration, it is possible for the tractor 1 to obtain the position information of itself based on the positioning system so as to perform autonomous driving in a field.

<Equipment Configuration of the Tractor 1>

Next, the configurations included in the tractor 1 for autonomous driving will be explained in detail. Specifically, as illustrated in FIG. 1 and FIG. 3, the tractor 1 includes the positioning antenna 6, the camera 35 for monitoring, the obstacle sensor 36, the steering actuator 43, the antenna unit 48 for wireless communication, the autonomous driving control device 51, the steering control device 52, the positioning measurement device 53, the wireless communication router (low-power data communication device) 54, the remote controller receiver (specified low-power radio device) 55, the sound emission part 57, etc.

The positioning antenna 6 is for receiving signals from a positioning satellite configuring a positioning system such as a satellite positioning system (GNSS) or the like. As illustrated in FIG. 1, the positioning antenna 6 is arranged on the upper surface of the roof of the cabin 11. The signals received by the positioning antenna 6 are input to the positioning measurement device 53 illustrated in FIG. 3, so that the position information of the tractor 1 is calculated by this positioning measurement device 53 as latitude and longitude information, for example. The position information calculated by the positioning measurement device 53 is obtained by the autonomous driving control device 51 to be utilized for controlling the tractor 1.

Although the details will be described later, the camera 35 is installed at a predetermined position of the tractor 1 (e.g., at a predetermined position capable of looking around by 360 degrees entirely in front, behind, left, and right), so as to monitor whether obstacles such as people exist in the vicinity and surroundings of this tractor 1 and to send the captured image data that is captured by the camera 35 from the third wireless communication antenna 48c to the tablet 70 via the autonomous driving bus line 56.

Although the details will be described later as well, the obstacle sensor 36 is configured of an infrared sensor or the like, for example, and is installed at a predetermined position of the tractor 1 (e.g., at a predetermined position capable of looking around by 360 degrees entirely in front, behind, left, and right) as with the camera 35, so as to be capable of monitoring whether obstacles such as people exist in the vicinity and surroundings of this tractor 1. Further, the detection result data of the obstacle sensor 36 is sent from the third wireless communication antenna 48c to the tablet 70 via the autonomous driving bus line 56.

The steering actuator 43 is installed in the middle part of the rotation axis (steering axis) of the steering wheel 12, for example, for adjusting the rotation angle (steering angle) of the steering wheel 12.

As illustrated in FIG. 1, the antenna unit 48 for wireless communication is arranged on the upper surface of the roof of the cabin 11 of the tractor 1 and includes the first to third wireless communication antennas 48a to 48c (see FIG. 3), which are connected for communication to the first to third wireless communication networks of different frequency bands.

1) The first wireless communication network is constructed with, for example, a specified low-power radio in the 920 MHz band or the like, which has a high data transmission speed, for the purpose of communication of positioning information according to the reference station 60.

2) The second wireless communication network is constructed with, for example, a low-power data communication system in the 2.4 GHz band or the like for the purpose of high speed communication of a large amount of data such as image data.

3) The third wireless communication network is constructed with, for example, a specified low-power radio in the 400 MHz band or the like for an amount of data transmission less than that of the second wireless communication network.

Note that the first wireless communication antenna 48a is electrically connected to the positioning measurement device 53, the second wireless communication antenna 48b is electrically connected to the wireless communication router 54, and the third wireless communication antenna 48c is electrically connected to the remote controller receiver 55.

The wireless communication router 54 connected to the second wireless communication antenna 48b communicates through the second wireless communication network with the tablet 70 which is capable of displaying an image and is operated by an operator outside the tractor 1. Further, this wireless communication router 54 receives control signals from the tablet 70 and outputs the control signals to the autonomous driving control device 51 via the autonomous driving bus line 56.

The remote controller receiver 55 connected to the third wireless communication antenna 48c performs wireless communication through the third wireless communication network with the later-described multiple (in the present embodiment, two) remote controllers 100, which are operated by an operator outside the tractor 1. Further, the remote controller receiver 55 is also configured to be capable of receiving control signals from each of the remote controllers 100 and, if control signals from these remote controllers are received, the remote controller receiver 55 sends the control signals to the autonomous driving control device 51 via the autonomous driving bus line 56. Note that, although the two remote controllers 100 are used in the present embodiment, it is possible to increase the number of remote controllers.

Although the details will be described later, the autonomous driving control device 51 and the steering control device 52 are configured to be capable of mutually communicating with each of the engine control device 15, the transmission control device 16, and the work machine control device 17 via the vehicle bus line 18.

Further, although the details will be described later, via the autonomous driving bus line 56 (which may be referred to as the "second bus line 56") in a communication system for autonomous driving, which is a different system from the communication system for operations with the vehicle bus line 18 (which may be referred to as the "first bus line 18"), the autonomous driving control device 51 is capable of mutually communicating with each of the positioning measurement device 53, the wireless communication router 54, the remote controller receiver 55, and the sound emission part 57 (warning unit for resuming of driving) which provides a notification for the surroundings with a buzzer for a predetermined period of time prior to resuming of driving after a temporary stop.

This autonomous driving control device 51 controls autonomous driving of the vehicle, based on information of a driving route generated on the tablet 70. Further, this autonomous driving control device 51 checks the position of the tractor 1 on the driving route, calculates the steering angle and driving speed of the tractor 1 in consideration of the tilt angle information, etc., and communicates with each of the control devices 15 to 17 and 52 through the vehicle bus line 18. Accordingly, the tractor 1 can perform agricultural work with the work machine 3 while performing autonomous driving along the driving route. In this way, the route inside the field area (driving area) in which the tractor 1 performs autonomous driving may be referred to as the "driving route" in the following explanations. Further, the area (work area) to be the target of agricultural work with the work machine 3 of the tractor 1 in the field area (driving area) is defined as the area excluding the headland area and margin from the entire field area and, when an operator or the like executes a work of registering the later-described registration points, the area is set based on these registration points as well as the entire length of the vehicle body of the tractor 1, the work width, etc.

The steering control device 52 is capable of executing steering according to the vehicle speed of the tractor 1 by communicating with each of the engine control device 15, the transmission control device 16, and the work machine control device 17 via the first bus line 18.

The positioning measurement device 53 is electrically connected to the first wireless communication antenna 48a in the antenna unit 48 for wireless communication, so as to communicate with the later-described reference station (portable reference station) 60 through the first wireless communication network with a specified low-power radio (e.g., wireless communication network in the 920 MHz band). As illustrated in FIG. 1, the antenna unit 48 for wireless communication is arranged on the upper surface of the roof of the cabin 11. The positioning measurement device 53 communicates with the reference station 60 at a position close to the field via the first wireless communication antenna 48a, so as to thereby correct satellite positioning information of the tractor 1 (mobile station) based on correction information from the reference station 60 and obtain the current position of the tractor 1. For example, various kinds of positioning methods such as DGPS (differential GPS positioning) and RTK positioning (real-time kinematic positioning) can be applied.

In the present embodiment, for example, RTK positioning is applied and the tractor 1, which is on the mobile station side, includes the positioning antenna 6 and, in addition, the reference station 60 including the reference station positioning antenna 61 is included. The reference station 60 is arranged at a position (reference point) where the driving of the tractor 1 is not hindered, such as around the field. Position information of the reference point, which is the installation position of the reference station 60, is set in advance. The reference station 60 includes the reference station communication device 62 capable of performing communication via the first wireless communication network which is constructed between the positioning measurement device 53 of the tractor 1 and a communication device with the first wireless communication antenna 48a.

In RTK positioning, the carrier phase (satellite positioning information) from the positioning satellites 63 is measured by both of the reference station 60 installed at the reference point and the positioning antenna 6 of the tractor 1, which is on the mobile station side for the target of which position information is to be obtained. The reference station 60 generates correction information including measured satellite positioning information, position information of the reference point, etc., each time satellite positioning information is measured with the positioning satellite 63 or each time a set period of time elapses, so as to send the correction information from the reference station communication device 62 to the first wireless communication antenna 48a of the tractor 1. The positioning measurement device 53 of the tractor 1 (which corresponds to the mobile station) corrects the satellite position information measured by the positioning antenna 6 by use of the correction information sent from the reference station 60, so as to obtain the current position information (e.g., latitude information and longitude information) of the tractor 1.

Note that, although a high-accuracy satellite positioning system utilizing a GNSS-RTK method is used in the present embodiment, there is not a limitation as such, and any other positioning system may be used as long as position coordinates can be obtained with high accuracy. GNSS-RTK is a positioning method in which the accuracy is improved by performing correction based on information of a reference station whose position is known, and there are multiple methods depending on the methods for distributing information from the reference station. Since the present invention is not dependent on GNSS-RTK systems, the details are omitted in the present embodiment.

Further, the positioning measurement device 53 is capable of measuring, not only position information of the tractor 1 (machine body 2) according to satellite positioning, but also information of the front, rear, left, and right tilt angles according to inertial measurement. The information of the tilt angles measured by the positioning measurement device 53 is obtained in a state of being associated with the position information (latitude and longitude information) by the autonomous driving control device 51 and is utilized for controlling the tractor 1. Note that the positioning measurement device 53 can also measure the height position of the positioning antenna 6 relative to the field surface and the height of the tractor 1 (machine body 2) accordingly.

The sound emission part 57 notifies workers or the like being around the tractor 1 that a driving resuming signal has been output to the tractor 1 as a notification that the tractor 1 will resume autonomous driving soon and as a warning for evacuating from the field for their safety. In a case where an operator of the remote controller 100 with which a temporary stop is performed performs a resuming operation, the sound emission part 57 of the present embodiment is thereby activated for a predetermined period of time in synchronization of the tractor 1 receiving the driving resuming signal that is output (only) from the remote controller 100 with which the resuming operation is performed, and the sound emission part 57 is configured with a buzzer included in the tractor 1 in the present embodiment. That is, the buzzer sound (warning sound) that is loud enough to be heard at least by the workers who monitor and operate the remote controllers 100 around the tractor 1 (within a radius of approximately 500 meters) is emitted.

<Autonomous Driving Control Device 51>

As illustrated in FIG. 3, based on an operation of an operator to the emergency stop button 110 of the later-described remote controllers 100, the autonomous driving control device 51 communicates with the engine control device 15 so as to thereby stop the fuel injection in the common rail device 41 and communicates with the transmission control device 16 so as to thereby activate the braking behavior of the later-described brake device 26 while the transmission 42 is in a neutral state. Here, it is also possible that the autonomous driving control device 51 communicates with the steering control device 52, so as to thereby control the steering actuator 43 so that the wheel 12 will be at the neutral position and make the direction of the left and right front wheels 7 and 7 face the forward travelling direction.

As illustrated in FIG. 3, via the second bus line 56, the autonomous driving control device 51 checks each of the communication state of the positioning measurement device 53 with the reference station 60 (communication state in the "first communication network"), the communication state of the wireless communication router 54 with the tablet 70 (communication state in the "second communication network"), and the communication state of the remote controller receiver 55 with the remote controllers 100 (communication state in the "third communication network").

Further, upon confirming that the communication state of any of the first to third communication networks has been cut off, the autonomous driving control device 51 communicates with the engine control device 15, the transmission control device 16, etc., so as to thereby emergently stop the autonomous driving of the tractor 1. Note that, in a case where the positioning measurement device 53, the wireless communication router 54, and the remote controller receiver 55 respectively do not receive signals from the communication counterparts for a predetermined period of time, it will be determined that the communication with the communication counterparts has been cut off.

Furthermore, the left-right pair of brake devices 26 that apply brakes on the left and right rear wheels 8 and 8 with the two systems, i.e., the operation of a brake pedal or parking brake lever and the automatic control, is installed in the tractor 1. That is, both of the left and right brake devices 26 are configured to apply brakes on both of the left and right rear wheels 8 and 8 with an operation on the brake pedal (or parking brake lever) in the braking direction. Further, the brake device 26 corresponding to the rear wheel 8 on the inner side of the turn is configured to automatically perform the braking behavior due to a command of the transmission control device 16 if the rotational angle of the wheel 12 exceeds a predetermined angle (what is termed as the auto-braking).

As described above and illustrated in FIG. 3, the camera 35 that captures images of the front, sides, and rear is mounted on the tractor 1. Further, as also described above, the obstacle sensor 36 that detects whether or not there is an obstacle in the front, sides, or rear is mounted on the tractor 1. The obstacle sensor 36 is configured of a laser sensor, ultrasonic sensor, etc., and recognizes an obstacle existing in the front, sides, and rear of the tractor 1 and generates a detection signal.

These camera 35 and obstacle sensor 36 are configured to be capable of performing wireless communication with the wireless communication router 54 and configured to send obstacle detection signals and image signals to the autonomous driving control device 51 via the wireless communication router 54 and the autonomous driving bus line 56. Further, if the wireless communication router 54 sends an image signal from the camera 35 to the tablet 70 through the second wireless communication network, it is thereby possible to display an image of the surroundings of the tractor 1 on the tablet 70. Note that it is also possible that the camera 35 and the obstacle sensor 36 are configured to be connected by wire to the autonomous driving control device 51 via the second bus line 56.

As illustrated in FIG. 1, the reference station 60 includes the reference station positioning antenna 61 that receives signals from the positioning satellite 63, the wireless communication antenna 64 that performs wireless communication with the tractor (work vehicle) 1 which performs autonomous driving, and the reference station communication device 62 that is electrically connected to each of the reference station positioning antenna 61 and the wireless communication antenna 64. The reference station 60 is installed at the reference point for specifying the position of the tractor (work vehicle) 1, which is the mobile station. The reference station 60 is configured to be disassembled into multiple components, and each disassembled component is configured to be in a size that is transportable for the tractor 1.

The reference station 60, which is installed at the reference point by assembling each disassembled component of the disassembled reference station 60, is designed to send signals from the positioning satellite 63, which are received by the reference station positioning antenna 61, to the reference station communication device 62. Further, the reference station communication device 62 is designed to generate correction information including measured satellite positioning information, position information of the reference point, etc. Furthermore, the reference station 60 sends the correction information, which is generated by the reference station communication device 62, from the reference station wireless communication antenna 64, which is connected to the first wireless communication network for communication (which is capable of communicating with the first wireless communication antenna 48*a* of the tractor 1 illustrated in FIG. 3).

Note that, in the present embodiment, a temporary stop of the tractor 1 includes a case of stopping due to a temporary stop signal that is output by the tablet 70 or the remote controllers 100, a case of stopping since the obstacle sensor 36 determines that there is an obstacle, a case in which connection for communication between the tablet 70 or the remote controllers 100 and the tractor 1 is lost during automatic driving of the tractor 1, etc. Further, the emergency stop of the tractor 1 includes a case of stopping due to an emergency stop signal which is output by the tablet 70 and the remote controllers 100, etc.

<Tablet 70 (First Remote Control Terminal 70)>

Figure 4A:
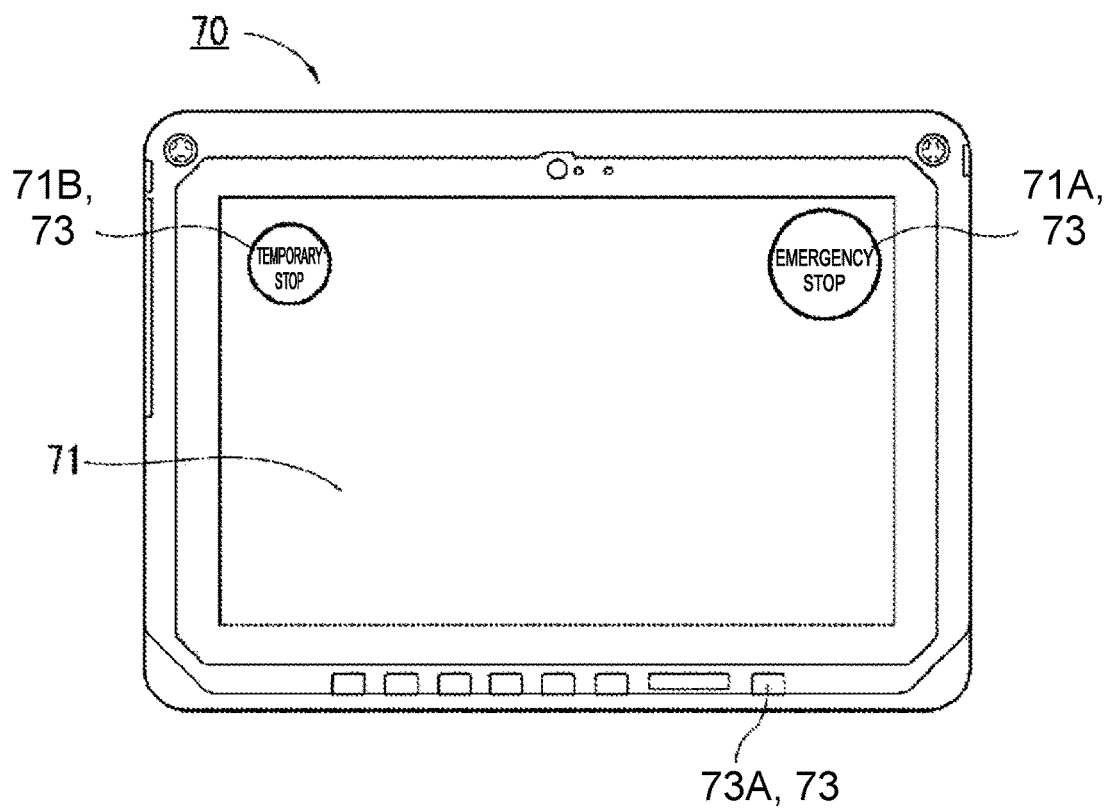
FIG. 4A is a plan view of a tablet according to the first embodiment of the present invention.
Figure 5:
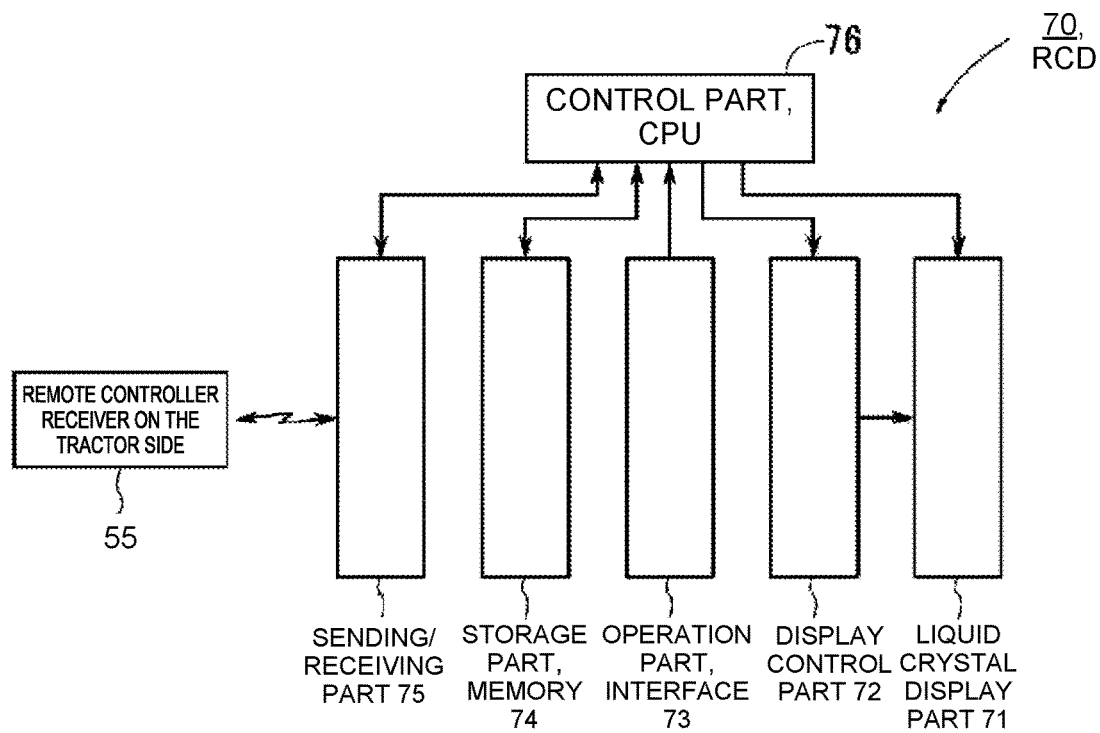
FIG. 5 is a configuration block diagram of the tablet according to the first embodiment of the present invention.

The first remote control terminal 70 of the present embodiment is configured as a tablet type personal computer including a touch panel and, as illustrated in FIG. 4A and FIG. 5, the liquid crystal display part 71 (which may be referred to as the "display 71"), the display control part 72, the touch panel type operation part 73, the storage part 74, the sending/receiving part 75, the control part 76 that controls these, etc., are included.

Further, although the tablet 70 of the present embodiment may have the same function as the notification part 130 which is installed in the later-described remote controllers 100, since it is possible to monitor the situation of the surroundings of the tractor 1 on the screen of the display screen 71 (hereinafter may be referred to as the "liquid crystal display part 71" or the "display 71") of the tablet 70 at any time in this embodiment and, in particular, since there will be a pop-up displayed on the screen of the display 71 of the tablet 70 in a case where there is any abnormality or failure in relation to the tractor 1, the tablet 70 does not have the same function as the notification part 130 of the remote controllers 100.

The input of the liquid crystal display part 71 is connected to the output of the control part 76, so that images captured by the camera 35 that is mounted on the tractor 1 are loaded and displayed on the liquid crystal display screen.

The input of the display control part 72 is connected to the output of the control part 76 and the output of the display control part 72 is connected to the input of the liquid crystal display part 71, so that such a control of appropriately switching the screens displayed on the liquid crystal display part 71 or the like is performed by operating the operation part 73, which will be subsequently explained, etc.

Further, in particular, the display control part 72 of the present embodiment is capable of selecting any one of the tablet 70 and the single or multiple (in the present embodiment, two) second remote control terminals as a remote control device that can execute an operation of resuming driving of the tractor 1. That is, in a case where the tractor 1 temporarily stops, a terminal that can resume the driving (hereinafter may be referred to as the "terminal capable of resuming driving") can be selected from among multiple remote control devices. Furthermore, this display control part 72 is configured to display a terminal capable of resuming driving, which is capable of performing the operation of resuming driving, on the later-described work selection screen WSA (see FIG. 8) in the lower part of the screen of the display 71 in a selectable manner from among the first remote control terminal and the single or multiple second remote control terminals. Note that, in the initial state, only the first remote control terminal is displayed on the display 71, and the second remote control terminals (100) are configured to be displayed after the communication with the tractor 1 is established.

Further, as will be described later with reference to FIG. 9 and FIG. 10, according to the configuration of the display control part 72, the form of displaying the remote controller 100 to be the remote controllable terminal on the display 71 of the tablet 70 is changed if the connection for communication between the tractor 1 and the second remote control terminal (remote controller 100) is lost.

Further, according to the configuration of this display control part 72, if the connection for communication between the one of the two remote controllers 100 that is selected as the terminal capable of resuming driving and the tractor 1 is lost and then the connection for communication with the tractor 1 is restored, it will be stored that the remote controller 100 that was selected immediately before the loss of the connection for communication had been the terminal capable of resuming driving.

Further, according to the configuration of the display control part 72 of this tablet 70, in a case where at least one of the two remote controllers 100 is selected as the terminal capable of resuming driving, a disclaimer screen enabling the control of resuming driving of the tractor 1 with the remote controller 100 is displayed.

Further, the display 71 includes a touch panel that can be operated with touching by the user, and the driving of the tractor 1 can be controlled by touching the items displayed on the display 71. Furthermore, the display 71 displays a screen for checking the working state in a case where the tractor 1 is performing work. On the screen for checking the working state, the generated driving route and the tractor 1 are displayed in the center of the screen, the emergency stop icon is displayed on the upper right side of the screen, and the temporary stop icon is displayed on the upper left side of the screen. In addition, an item for transitioning to a screen capable of checking detailed work information is provided on the right side of the screen, and, by touching the item, the "work information setting mode" capable of checking the remaining amount of battery of the remote controllers 100 can be displayed.

The storage part 74 is configured with, for example, a ROM (Read Only Memory), RAM (Random Access Memory), or the like which stores data related to a driving route of the tractor 1 in the field area (driving area), data of the remote controllers 100 that are registered due to pairing, etc., and the storage part 74 is connected to the control part 76.

In this way, the display 71 of the tablet 70 can display the screen for checking the working state. Further, on the screen for checking the working state, the emergency stop button image 71A (see FIG. 4A) is displayed in the upper right part of the screen as an icon for emergently stopping the autonomous driving of the tractor 1. Similarly, the temporary stop button image 71B (see FIG. 4A) is displayed in the upper left part of the display 71 as an icon for starting or stopping the autonomous driving of the tractor 1 in a smaller size than the emergency stop button image 71A. In this way, on the display 71, since the emergency stop button image 71A is displayed in the easily-recognizable upper right part of the display 71, the position of the emergency stop button image 71A can be easily recognized when the operator wants to emergently stop the tractor 1, and thus delay of the emergency stop operation and an erroneous operation can be prevented.

Note that, regarding the configuration of the tablet 70 of the present embodiment, considering that right-handed people are generally the majority, since it is customary and familiar to provide an operation to the emergency stop button, etc., with the right hand, which is the dominant hand, while holding the tablet 70 with the left hand, the emergency stop button image 71A is displayed in the upper right part of the display 71. However, in consideration of the use by left-handed people as well, it is configured to be capable of switching the setting to the configuration of displaying and forming the emergency stop button image 71A on in the upper left of the display 71.

Figure 4B:
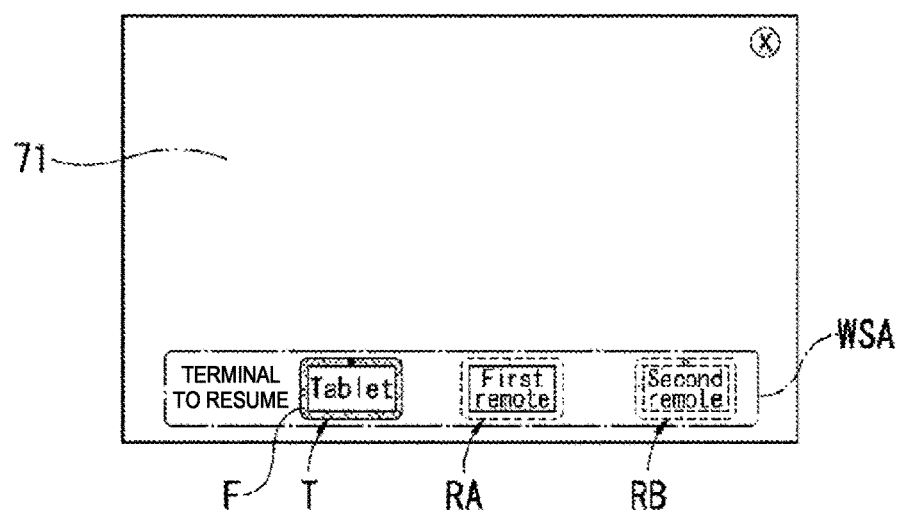
FIG. 4B is an explanatory diagram illustrating a display screen on a display of the tablet according to the first embodiment of the present invention.

Furthermore, as illustrated in FIG. 4B, for example, the display 71 of the present embodiment can display the "work information setting mode" on the screen, so as to set the terminal capable of resuming driving. On the screen for checking the working state, by touching the item for transitioning to the screen on which the work information can be checked in detail, it is possible to switch to the screen that is set as the work information setting mode. Further, in the area where the settings of selecting and switching of remote control terminals or the like can be performed (hereinafter referred to as the "selection area WSA" (see FIG. 8)) in the lower part of the screen of the work information setting mode, multiple (in this embodiment, three kinds) icons to be the targets of selection of the remote control device capable of performing the operation of resuming driving of the tractor 1 during a temporary stop, i.e., the tablet image T indicated by "Tablet", the first remote controller image RA indicated by "First remote", and the second remote controller image RB indicated by "Second remote", are displayed.

Further, on the work information setting mode screen, the state where a rectangle display image bordering the entire periphery of an image so that the periphery of the respective image is enclosed indicates the state where the icon is operable (hereinafter may be referred to as "selected"), that is, being a "terminal capable of the resuming operation".

For example, in the case of FIG. 4B, as the icons for selecting a terminal capable of the driving resuming operation, the tablet image T and the first remote controller image RA are displayed. On the other hand, although the second remote controller image RB is registered, there is no connection for communication with tractor 1. Therefore, only the tablet image T and the first remote controller image RA can be selected as the remote control devices that are currently capable of the resuming operation. Furthermore, especially in the case of FIG. 4B, since the image F enclosing the periphery of the tablet image T of the tablet 70 is displayed, this tablet image T corresponds to the terminal capable of the resuming operation.

Further, when the screen is in the display state illustrated in this FIG. 4B, F that encloses the periphery of the first remote controller image RA is displayed by touching the first remote controller image RA with a finger. That is, the terminal capable of the resuming operation will be changed from the tablet 70 to the first remote controller.

The tablet 70 of the present embodiment with such a configuration allows the operator to refer to the information displayed on the touch panel of the tablet 70 (e.g., information of the field required for performing autonomous driving) and to perform various kinds of operations while visually checking the information. Further, the operator can operate the tablet 70 and send various kinds of control signals for controlling the tractor 1 to the autonomous driving control device 51 of the tractor 1.

Note that the first remote control terminal 70 of the present embodiment is not limited to such a tablet type personal computer, and, instead, the first remote control terminal 70 can be configured with a laptop type personal computer, for example. Alternatively, in a case where a manned tractor (illustration in the drawings is omitted) is made to drive so as to accompany the unmanned tractor 1, a monitor device mounted on the manned tractor can be used as the first remote control device.

<Remote Controller 100>

Figure 6:
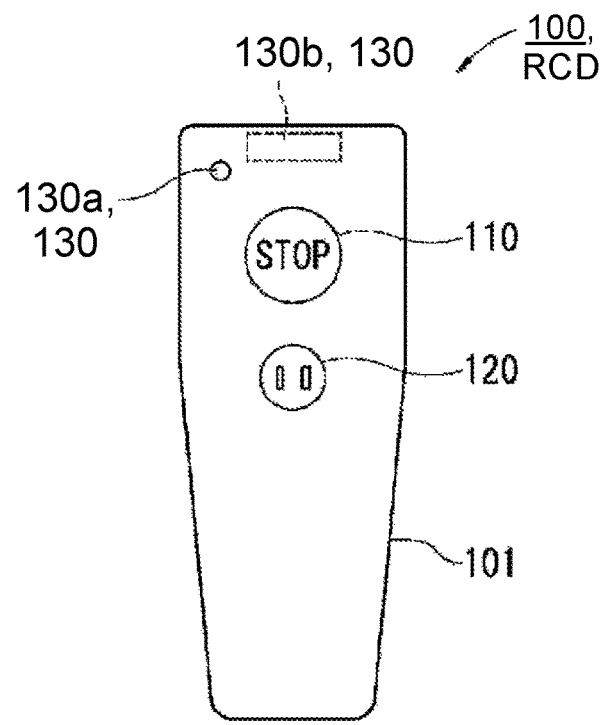
FIG. 6 is a plan view of a remote controller according to the first embodiment of the present invention.

Regarding the remote controllers 100, as illustrated in FIG. 6, the first switch part 110 (hereinafter referred to as the "emergency stop button 110"), the second switch part 120 (hereinafter referred to as the "temporary stop button 120"), and the notification part 130, etc., are installed in the remote controller body 101. Of these, the notification part 130 includes the light emission part 130a having an LED lamp that emits light in multiple forms of light emission and the audio output part 130b that emits sound in multiple audio forms. Note that the second remote control terminal 100 of the present embodiment is configured with the two remote controllers, and, to clearly identify these, the two remote controllers may be referred to as the first remote controller 100A and the second remote controller 100B, as described above.

Further, these remote controllers 100 are carried by multiple (in the present embodiment, two) operators who monitor the tractor 1 at places in the area where the tractor 1 working near the field can be visually checked and the buzzer sound from the sound emission part 57 of the tractor 1 can be heard, and, usually, each of the operators can appropriately remotely operate the tractor 1 with wireless communication as need.

Here, an explanation will be given of the relationship between the tractor 1 and the remote controllers 100. If an external device such as the service tool 45 or tablet 70 requests the remote controllers 100 of the tractor 1 for pairing with the remote controllers 100, the remote controller receiver 55 transitions to the pairing mode for authentication of the remote controllers 100. Further, if the remote controller receiver 55 that has transitioned to the pairing mode receives a signal from the remote controllers 100, the remote controller receiver 55 stores the remote controller IDs (identification information) of the remote controllers 100 and then sends the stored remote controller IDs to the remote controllers 100, so as to establish the pairing.

If the service tool 45 which can set various kinds of functions of the tractor 1 is connected by wire to the vehicle bus line 18 of the tractor 1 and a service person operates the service tool 45, the authentication process (pairing) of the remote controllers 100 will thereby be executed by the remote controller receiver 55. The remote controller receiver 55 of the tractor 1 can authenticate multiple (in the present embodiment, two) remote controllers 100, which will be stored in association with the remote controller numbers that correspond to the remote controller IDs of the respective remote controllers 100 used for stopping.

If the remote controller number to be the authentication target is selected and an instruction for pairing registration is provided due to an operation performed to the service tool 45, the remote controller receiver 55 is notified of the remote controller number to be the target of the pairing registration via the autonomous driving control device 51. Upon receiving the instruction for the pairing registration, the remote controller receiver 55 recognizes the remote controller number to be the target of the pairing registration and transitions to the pairing mode in which signals from the remote controller 100 can be received.

If the remote controller 100 accepts an operation performed to the emergency stop button 110 or the temporary stop button 120, the remote controller 100 reads out the remote controller ID, which is identification information assigned for each remote controller 100, from the storage part 140 and sends the remote controller ID to the remote controller receiver 55 via the sending/receiving part 75. The following explanation will be given on the premise that the remote controller ID is sent to the remote controller receiver 55 based on an operation performed to the emergency stop button 110. Upon receiving the remote controller ID of the remote controller 100, the remote controller receiver 55 stores the received remote controller ID in association with the remote controller number. Further, the remote controller receiver 55 stores a communicator ID, which is identification information assigned for the remote controller receiver 55 of each tractor 1. The remote controller receiver 55 generates a response signal, in which the received remote controller ID and the receiver ID are combined, and sends the response signal to the remote controller 100 via the third wireless communication antenna 48c.

If the remote controller 100 receives the response signal from the remote controller receiver 55, the remote controller 100 confirms that the remote controller ID, which is confirmed from the response signal, matches the remote controller ID of itself, so as to recognize that the pairing has established. Furthermore, the remote controller 100 extracts the receiver ID from the response signal and stores the receiver ID in the storage part 140, so as to specify the remote controller receiver 55 and the tractor 1 of which the pairing has established. Further, if an operation directed to the remote controller 100 and the emergency stop button 110 is accepted, the light emission part 130a is made to light with the third color (yellow) as a notification of being the pairing mode. Thereafter, if the pairing with the remote controller receiver 55 has established, the remote controller 100 provides a notification of the establishment of the pairing with the notification part 130.

Note that the pairing registration is performed through wired connection in a case of the service tool 45, the pairing registration is performed through wireless connection in a case of the tablet 70.

Figure 7:
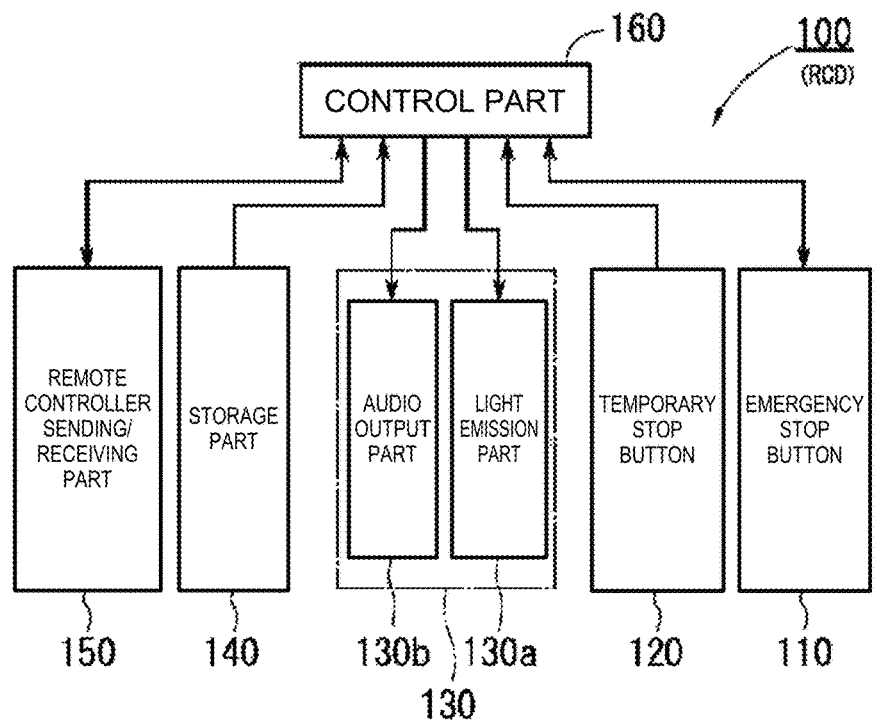
FIG. 7 is a configuration block diagram of the remote controller according to the first embodiment of the present invention.

As illustrated in FIG. 7, the remote controller 100 of the present embodiment includes the above-described emergency stop button 110, temporary stop button 120, light emission part 130a and audio output part 130b that configure the notification part 130, as well as storage part 140, remote controller sending/receiving part 150, control part 160, etc. Furthermore, in the present embodiment, although a resuming button is included as a temporary means to be used in a case where the resuming operation with the emergency stop button 110 and the temporary stop button 120 cannot be performed, this resuming button is not specifically essential.

The emergency stop button 110 is for emergently stopping the driving tractor 1 in order to secure the safety in a case of the occurrence of such an emergency where a person enters the field during driving of the tractor 1 which is a work vehicle, for example, and, to be conspicuous at the time of an operation, the emergency stop button 110 is formed to be the largest shape among the buttons installed on the front face of the remote controller body 101 and is installed with a description of "STOP" on the upper side of the remote controller body 101. The output of this emergency stop button 110 is connected to the input of the control part 160, and, by pressing this emergency stop button 110, the emergency stop signal is sent to the autonomous driving control device 51 on the tractor 1 side via the control part 160, so that the tractor 1 emergently stops.

The temporary stop button 120 is for stopping the driving tractor 1 in such a case of ending or temporarily suspending a predetermined work with the tractor 1 which is a work vehicle, for example (i.e., in such a case of a normal work break with a low degree of urgency). The temporary stop button 120 of the present embodiment has a shape slightly smaller than the emergency stop button 110 and is marked at an appropriately central part of the remote controller body 101 with a stop sign for which two thick and wide vertical bars are arranged close to each other. The output of this temporary stop button 120 is connected to the input of the control part 160, and, by pressing this temporary stop button 120, the temporary stop signal is sent to the autonomous driving control device 51 on the tractor 1 side via the control part 160, so that the tractor 1 temporarily stops.

Further, as will be described in detail in the later-described function section, the present embodiment is specifically configured to be capable of resuming driving by performing a specific operation using the emergency stop button 110 and this temporary stop button 120. That is, the driving of the stopped tractor 1 can be resumed by performing a pressing operation on the emergency stop button 110 and the temporary stop button 120 at approximately the same time and releasing the pressing of the emergency stop button 110 and the temporary stop button 120 within a specific period of time. Further, as another form, in a state where the tractor 1 is in a temporary stopped state, the driving of the stopped tractor 1 can be resumed by performing a pressing operation on the temporary stop button 120 for a specific period of time and releasing the pressing within a specific period of time.

Note that, although the present embodiment has a configuration in which either of the tablet 70 and the single or multiple remote controllers 100 can be selected as the terminal capable of resuming driving by use of the tablet 70, it is also possible that, in a case where multiple remote controllers 100 are included, the resuming operation can be performed only by the one of the remote controllers that temporarily stopped the driving of the tractor 1. The autonomous driving control device 51 of the tractor 1 stores the remote controllers 100 in an identifiable manner at the time of pairing registration. Therefore, it is configured so that whether the signal of the resuming operation is output to the tractor 1 by any one of the remote controllers 100 can be determined.

Further, the present invention including the present embodiment is configured so that, in a case where abnormality is detected by the obstacle sensor 36 included in the tractor 1, the driving resuming signal from the tablet 70 and the remote controllers 100 is not accepted. Therefore, it is configured so that, in a case where abnormality is detected by the obstacle sensor 36, even though the driving resuming signal is output from the tablet 70 and the remote controllers 100 to the control part 160, the driving of the tractor 1 will not be resumed. Note that the abnormality detected by the obstacle sensor 36 includes a case in which the obstacle sensor 36 detects an obstacle and a case in which the obstacle sensor 36 is not properly working.

Regarding the light emission part 130a and the audio output part 130b, the vehicle situation of the tractor 1 in the automatic driving state can be checked from the light emission mode and the audio mode. The light emission part 130a functions as a means of remotely checking the current surrounding environment of the tractor 1 in the automatic driving state. For example, it is configured with an LED (light emitting diode) that emits light in the following three kinds of modes.

If light in green color is emitted, the tractor 1 is in the automatic driving state.

If light in yellow color is emitted, the tractor 1 is in the temporary stop state.

If light in red color is emitted, the tractor 1 is in the emergency stop state.

The above is what the operator of the remote controllers 100 will be notified of. Note that, in such a case where the connection for communication between the remote controller 100 and the tractor 1 is lost, the light emission part 130a emits light in green color and the audio output part 130b outputs a buzzer sound for a predetermined period of time. If the communication between the tractor 1 and the remote controller 100 is lost, the automatic driving mode of the tractor 1 is cancelled, and, in a case where the connection for communication with the tractor 1 is not restored, the power source of the remote controller 100 will be turned off.

On the other hand, the audio output part 130b functions as a means of remotely checking the vehicle condition of the tractor 1 in the automatic driving state as with the light emission part 130a. For example, it is configured so that checking can be done in the following audio modes.

In a case where the tractor 1 temporarily stops, the buzzer sound is output for several seconds (e.g., one second).

In a case where the tractor 1 emergently stops (in this case, it corresponds to the case where the communication between the tractor 1 and the remote controller 100 is lost), the buzzer sound is intermittently output for a predetermined period of time (e.g., ten seconds).

The above is what the operator of the remote controllers 100 will be notified of. Note that the present invention is not particularly limited to have such light emission modes and audio modes.

Furthermore, as described above, in a case where the tractor 1 is temporarily stopped, the light emission part 130a of the remote controller 100 blinks in yellow color. In such a case, in a situation where the operator of the remote controller 100 is so far away from the tractor 1 that he/she cannot see the tractor 1, the state of the tractor 1 cannot be checked. Therefore, it is configured so that, in a case where the tractor 1 is temporarily stopped, the state of the tractor 1 can be checked with the notification part 130 via an operation to the remote controller 100. Specifically, whether the driving of the tractor 1 can be resumed can be checked with the light emission part 130a and the audio output part 130b by operating the temporary stop button 120 on the remote controller 100. For example, in a case where the tractor 1 is in a state where the resuming operation cannot be performed, the light emission part 130a lights up in red color (first color) and the audio output part 130b outputs a buzzer sound (first sound). Further, in a case where the tractor 1 is in a state where the resuming operation can be performed, the light emission part 130a lights up in green color (second color) and the audio output part 130b outputs a buzzer sound (second sound). Note that the above-described first sound and second sound may be different sounds or the same sound. In the present invention, as described above, the resuming operation can be performed by the remote controller 100 that performed the current temporary stop (the last stop) only. Note that, as another embodiment described above, even in a case where the driving can be resumed by the remote controller 100 that performed the temporary stop operation only, the current situation of the tractor 1 can be checked by the remote controllers 100 other than the remote controller 100 that performed the temporary stop operation.

The storage part 140 is for storing the remote controller ID which is sent to the tractor 1 at the time of registration along with pairing with the tractor 1 and is configured with a ROM (Read Only Memory), RAM (Random Access Memory), or the like that is connected to the control part 160.

The emergency stop signal associated with the operation to the emergency stop button 110, the temporary stop signal associated with the operation to the temporary stop button 120, the resuming control signal generated by operating the emergency stop button 110 and the temporary stop button 120 approximately at the same time, the accessorial resuming signal associated with the operation on a resuming button (illustration in the drawings is omitted) which is supplementarily installed, etc., are output by the remote controller sending/receiving part 150 to the tractor 1 side via the control part 160, and the remote controller sending/receiving part 150 is for receiving various kinds of signals that are sent from the tractor 1 side and for outputting the various kinds of signals to the control part 160.

The resuming button is an operation button for resuming the temporarily-stopped tractor 1 but is not normally used, and the resuming button, whose output is connected to the input of the control part 160, can be used or operated in such a case where the resuming control signal which should be normally generated by a simultaneous operation to the emergency stop button 110 and the temporary stop button 120 is not generated and any one of these buttons has a problem or abnormality, for example. Note that, since the resuming button of the present embodiment is not normally used, the resuming button is installed at a position that is not easily seen in normal times. For example, a small right-pointing triangular symbol is notated and installed inconspicuously at the bottom part near a logo or the like indicating the name of the company, which is not illustrated in the drawings.

<Screen Transition Operation>

Next, the screen transition operation on the tablet 70, which is the first remote control terminal according to an embodiment of the present invention, will be explained with reference to FIG. 5, FIG. 8, etc.

Figure 8:
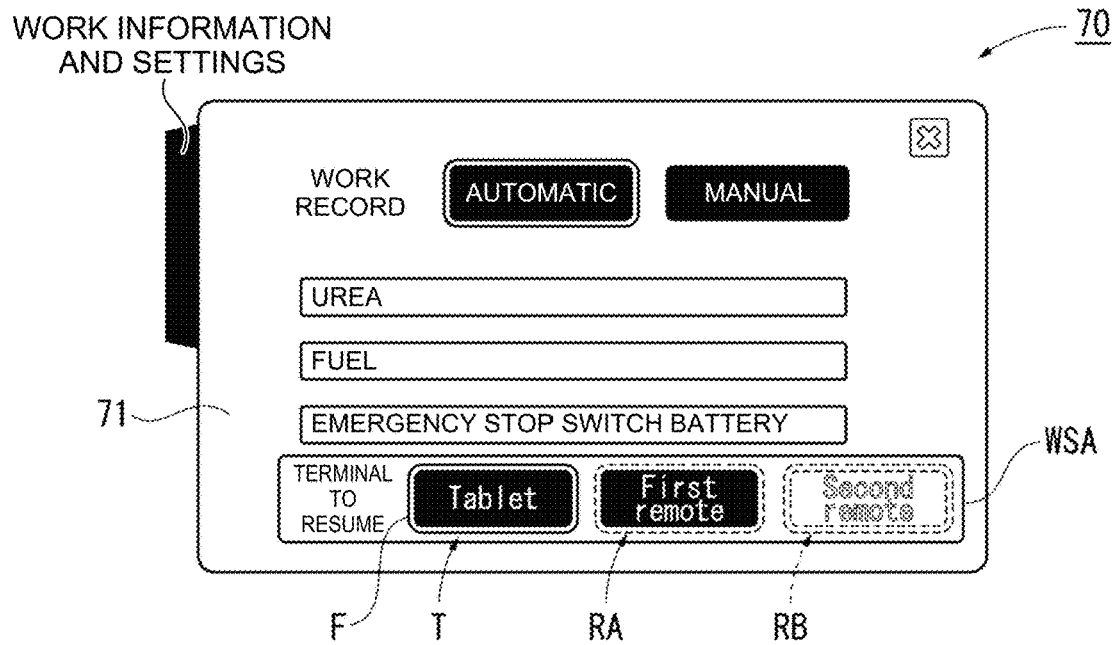
FIG. 8 is an explanatory diagram illustrating a work selection area on the display of the tablet according to the first embodiment of the present invention.

After an instruction for the automatic driving is provided from the tablet 70 to the tractor 1, the control part 76 illustrated in FIG. 5 forms patterns which are to be the respective icons for making it possible to appropriately select and display the tablet 70, which is the first remote control terminal, and the first remote controller 100A and second remote controller 100B, which are the second remote control terminals, in the work selection area WSA displayed in the lower part of the work information setting mode screen illustrated in FIG. 8. These are hereinafter referred to as the "tablet icon T", the "first remote icon RA", and the "second remote icon RB", respectively.

On the screen illustrated in FIG. 8, the tablet icon T and the first remote icon RA are displayed in solid line. That is, only the tablet 70 and first remote controller 100A are in the state where the registration by the pairing with the tractor 1 is done and the connection for communication is established and, thus, are displayed in a manner capable of being selected as the terminal capable of resuming driving. Such a state is referred to as being an "active icon". On the other hand, the second remote icon RB, which is indicative of the second remote controller 100B, is registered with the tractor 1 but is displayed in dashed line since the connection for communication is lost. Such a display state is referred to as being an "inactive icon".

In the case of FIG. 8, a narrow-shaped image (hereinafter referred to as the fringe F) enclosing the outside of the tablet icon T is displayed. That is, the tablet icon T is displayed so as to indicate that the tablet 70 is the terminal capable of performing the operation of resuming the driving of the tractor 1. Such a state is referred to as being a "launch icon". Further, by touching an icon displayed as an "active icon", it can be turned into a "launch icon". Note that, in the initial state, i.e., before the start of autonomous driving of the tractor 1, the launch icon and the active icon are the tablet icon T only since registration along with pairing with the remote controllers 100 has not been done.

Further, as for the launch icon, always only one launch icon is selectively displayed in the work selection area WSA, in order to prevent occurrence of the later-described interference of different operations, and it is configured so that two launch icons cannot be generated simultaneously. Note that, as long as safety is ensured, it is also possible that driving can be resumed by two or more remote control devices.

Figure 11A:
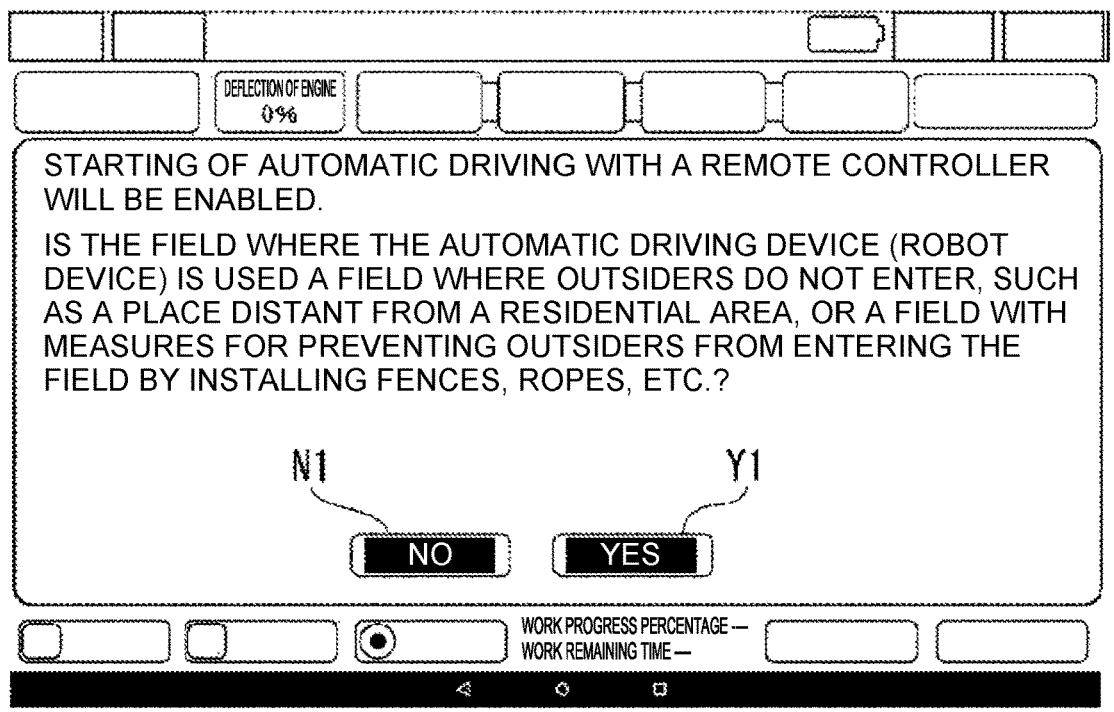
FIG. 11A is an explanatory diagram illustrating an operation selection menu to be displayed in a case of the operation of selecting a remote controller.
Figure 11B:
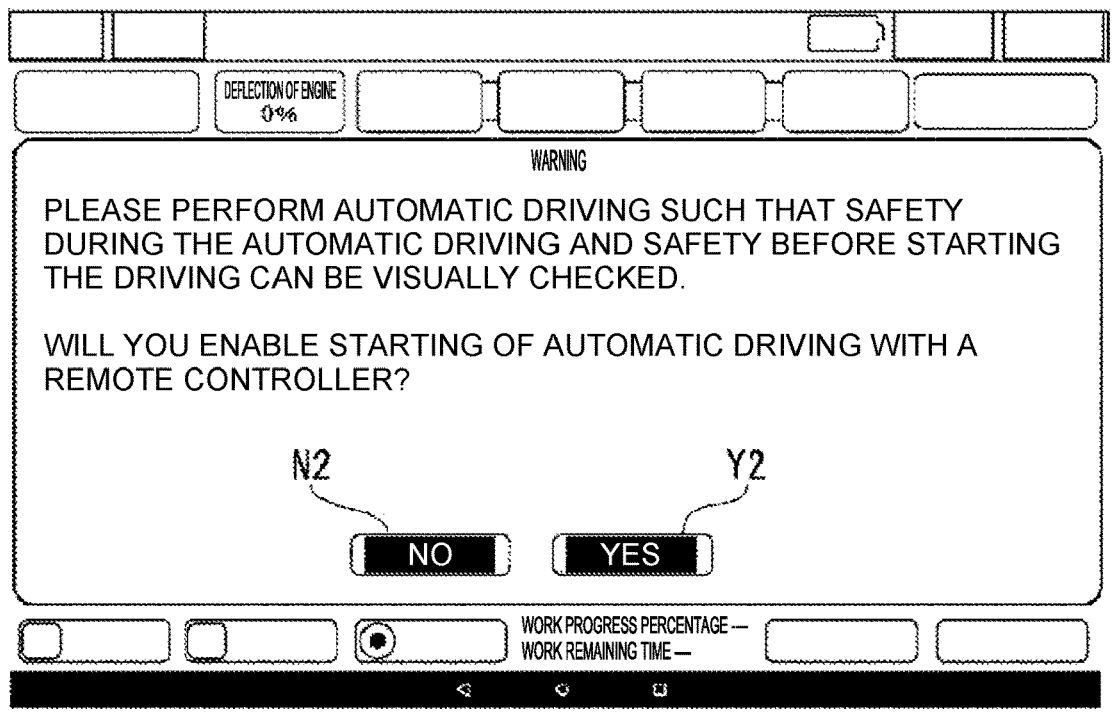
FIG. 11B is an explanatory diagram illustrating an operation selection menu to be displayed in a case of the operation of selecting a remote controller.

In addition, even if the remote controller 100 is registered by pairing with the tractor 1 and the first remote icon RA and the second remote icon RB are displayed as active icons on the display of the tablet 70, the tablet icon T is displayed as the launch icon from the aspect of safety. Here, in a case where either the first remote icon RA or the second remote icon RB is selected as the launch icon, such a disclaimer requesting confirmation of safety as illustrated in FIG. 11A and FIG. 11B will be displayed.

Here, an explanation will be given of occurrence of the above-described interference of different operations. In conventional autonomous driving systems, there is a proposal having a configuration with multiple second remote control terminals such as remote controllers, so that multiple operators working in the same field carry the second remote control terminals, respectively, so as to improve the monitoring system as well as improve safety in the field.

In the autonomous driving system described above, although the safety is improved since the emergency stop can be performed by the multiple remote controllers, different operations may be performed simultaneously by multiple remote controllers (hereinafter referred to as "interference of different operations"). In such cases, there is a risk that unintended autonomous driving is executed due to interference of different operations. Further, for example, there may be a situation in which, in a case where a work vehicle is temporarily stopped by any one of the remote control terminals when a person enters the field where the work vehicle is working, an operator of a remote control terminal such as a remote controller other than the operator who executed the temporary stop erroneously resumes the driving of the work vehicle without checking the safety. On the other hand, in the automatic driving system according to the present embodiment, it is possible to realize an automatic driving system with a high degree of safety, in which, when one work vehicle is operated by multiple remote control terminals, the occurrence of a situation where respective remote control terminals perform different operations (interference of different operations) can be prevented.

Switching Operation and Display of the Transition State: Example 1

Next, the operation of switching these three kinds of icons will be explained in detail with reference to FIG. 9 and FIG.

10. Note that, for specifically explaining the transition behavior, the description specifying the respective stages ST is used on the drawings, and the respective stages are indicative of the contents displayed in the current work selection area WSA. Further, in Example 1, the registration by pairing with the tractor 1 has been completed for the first remote controller 100A only.

Figure 9:
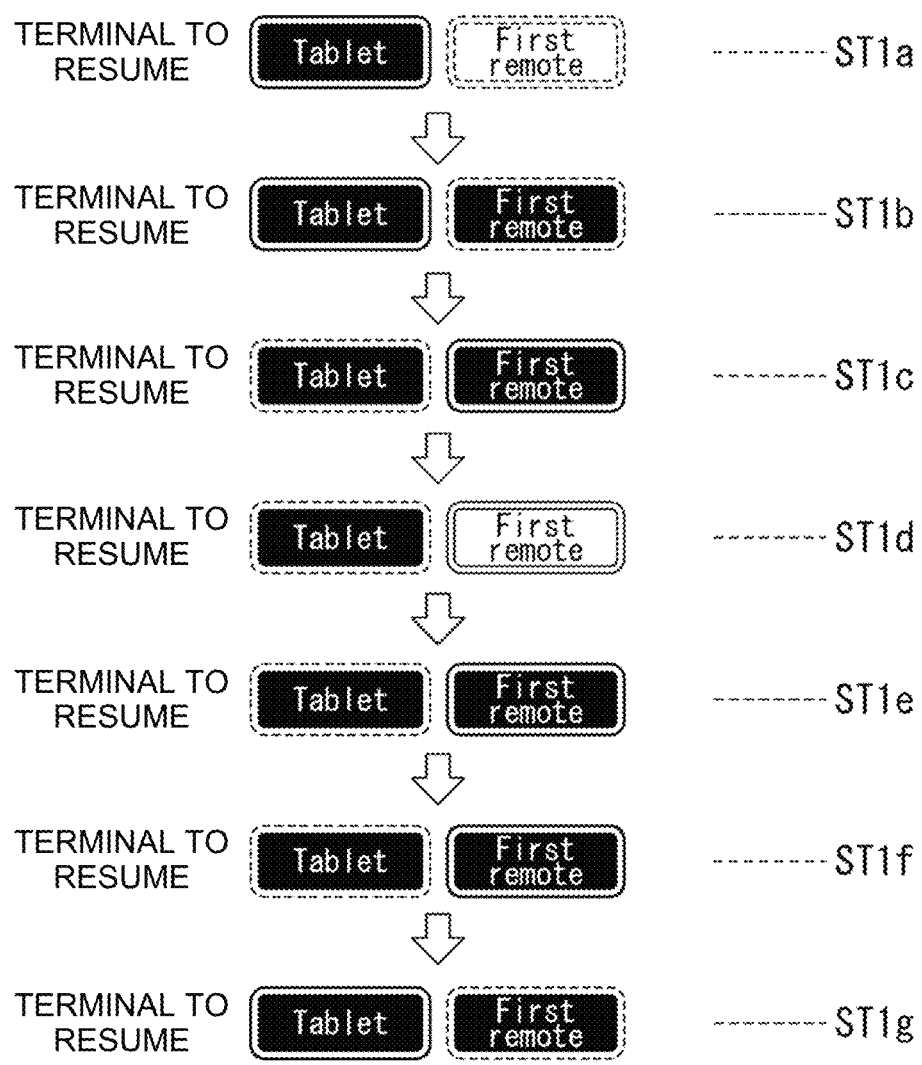
FIG. 9 is a transition diagram illustrating Example 1 of operation forms of selecting the remote controller to be operable in a case where a resuming operation is performed after the robot tractor according to the first embodiment of the present invention stops.
Figure 10:
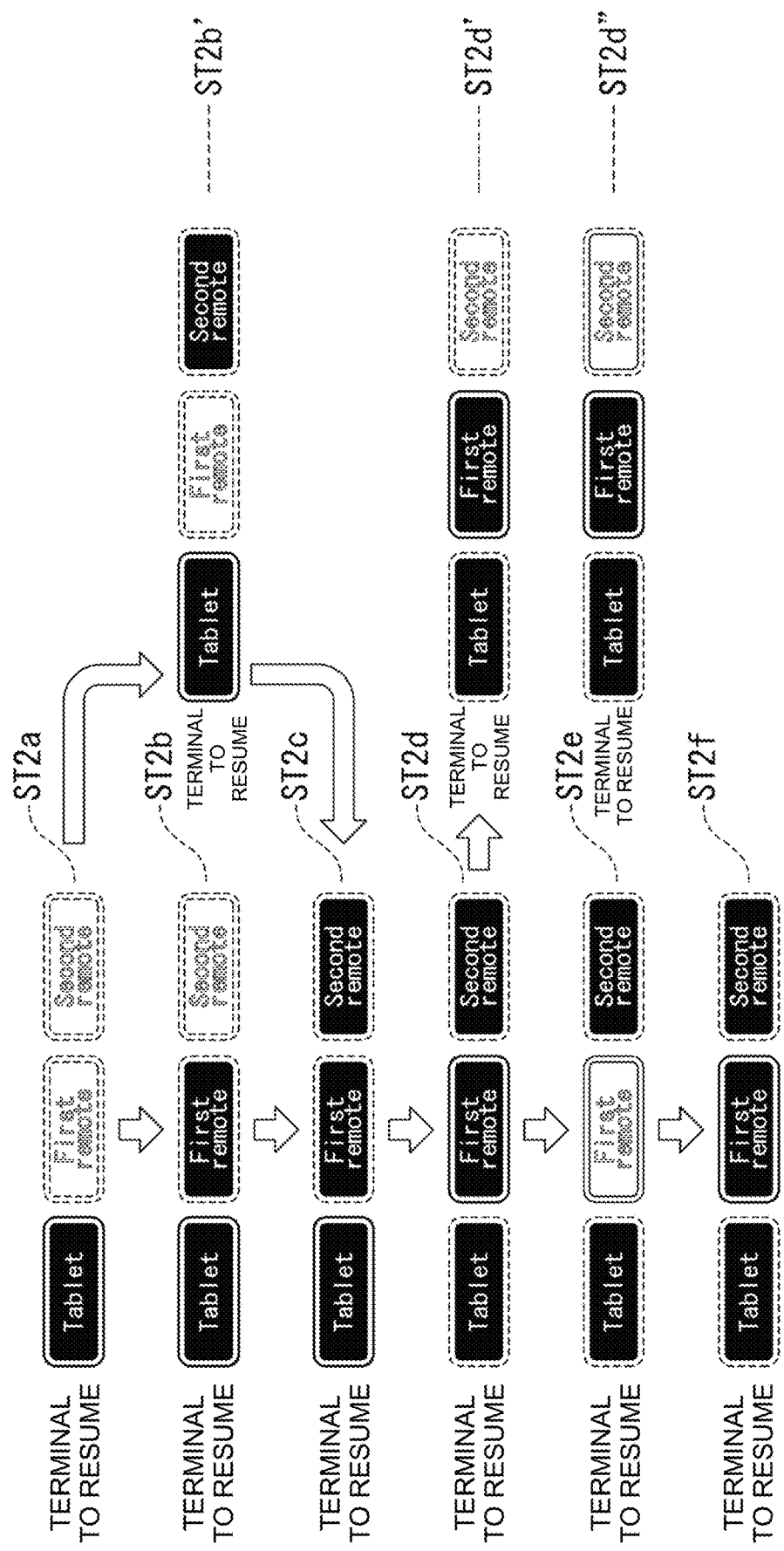
FIG. 10 is a transition diagram illustrating Example 2 of operation forms of selecting the remote controller to be operable in a case where a resuming operation is performed after the robot tractor according to the first embodiment of the present invention stops.

First, in FIG. 9, the remote control terminal that can resume driving of the tractor 1, i.e., the launch icon, in the initial state is the tablet icon T (first stage ST1a). Note that, in this state, the connection for communication between the first remote controller 100A and the tractor 1 is lost.

Here, for example, in a case where the connection for communication between the first remote controller 100A and the tractor 1 is restored, the first remote icon RA will be displayed as an active icon (second stage ST1b).

Furthermore, if this first remote icon RA that has become an active icon is touched, the display (pattern) of the fringe F part of the tablet icon T that had been the launch icon until then disappears, and, concurrently, the fringe F pattern is generated and displayed around the active icon RA (third stage ST1c). Accordingly, the first remote icon RA is switched to and functions as the launch icon.

Note that, in a case of transitioning to the display state of this third stage ST1c, a screen with a description of such a disclaimer requesting confirmation of safety as illustrated in FIG. 11A and FIG. 11B will be displayed. First, the screen of FIG. 11A is displayed, and, if the icon Y1 with display of "Yes" is touched, the screen will transition to the screen of FIG. 11B, so that the screen on which a disclaimer requesting confirmation of safety will be displayed again, and, if the icon Y2 with display of "Yes" is touched, the screen will transition to the next display screen, i.e., the third stage ST1c. Note that, if either of the "No" icon N1 and the "No" icon N2 displayed in FIG. 11A and FIG. 11B is touched, the display does not transition to the third stage STc and returns back to the second stage ST1b.

Furthermore, in a case where the connection for communication between the first remote controller 100A and the tractor 1 is lost when the first remote icon RA is the launch icon as in the third stage ST1c, the display of the inner area part disappears, so that the display will be as in the fourth stage ST1d. Note that, in a case where the connection for communication between the tractor 1 and the first remote controller 100A or the tablet 70 is lost, the automatic driving of the tractor 1 will be stopped due to safety issues.

Further, if the communication state is restored, the display returns to the same state as in the third stage ST1c again (fifth stage ST1e). In other words, even if the communication state is lost, if the communication recovers, the previous setting state will be restored since the autonomous driving control device 51 stores the state immediately before the communication state was cut off.

Further, if the tractor 1 starts automatic driving, the tractor 1 requests the tablet 70 for transferring a route path. Accordingly, a route path is periodically transferred from the tablet 70 to the tractor 1, so that it is possible to continue the automatic driving. Note that, in a case where the automatic driving continues, the state in which the launch icon is selected can be maintained (sixth stage ST1f).

On the other hand, in a case where the power source of the engine is turned off, the screen transitions to the initial setting screen (seventh stage ST1g).

Another Switching Operation and Display of the Transition State: Example 2

Subsequently, another transition form will be explained with reference to FIG. 10. Further, in Example 2, unlike Example 1, the registration by pairing with the tractor 1 has been completed for not only the first remote controller 100A but also for the second remote controller 100B. In FIG. 10, the tablet icon T is displayed as the launch icon, and the first remote icon RA and the second remote icon RB are displayed as inactive icons (first stage ST2a).

In a case where the connection for communication between the first remote controller 100A and the tractor 1 has recovered in the first stage ST2a, the first remote icon RA will be displayed in solid line and transition to the state of an active icon (second stage ST2b).

Further, in a case where the connection for communication between the second remote controller 100B and the tractor 1 has recovered in the second stage ST2b, the second remote icon RB will be displayed in solid line and transition to the state of an active icon (third stage ST2c).

Furthermore, of these active icons, i.e., the first remote icon RA and the second remote icon RB, if the first remote icon RA is touched, the transition will be performed so that the first remote icon RA will be displayed as the launch icon (fourth stage ST2d) although the tablet icon T is displayed as the launch icon in the initial state. Note that, for transitioning to this fourth stage ST2d, as explained in Example 1, the transition to the fourth stage ST2d will not be performed unless providing the operations of selecting "Yes" Y1 and Y2 at both times when the display is switched to FIG. 11A and FIG. 11B.

Next, if a communication lost state occurs between the second remote controller 100B and the tractor 1 or the tablet 70 in this fourth stage ST2d, the display of the second remote icon RB, which had been an active icon, will disappear and become an inactive icon, and thus it is possible to check the state where the communication state with the second remote controller 100B is lost (fourth stage ST2d').

On the other hand, when the loss of communication occurs between the first remote controller 100A and the tractor 1 in the fourth stage ST2d, the display of the internal part of the first remote icon RA, which had been the launch icon, will disappear, and thus it is possible to check the state where the communication state with the first remote controller 100A is lost (fifth stage ST2e).

Further, if the communication state recovers later, the display returns to the same state as in the fourth stage ST2d again (sixth stage ST2f).

Note that, in the state of the first stage ST2a, i.e., in the case where only the tablet 70 is connected for communication with the tractor 1 and the connection for communication between the first remote controller 100A and the second remote controller 100B and the tractor 1 is lost, if the connection for communication between the second remote controller 100B and the tractor 1 recovers, for example, the second remote icon RB will be displayed in solid line and transition to the state of being an active icon (second stage ST2b').

Here, furthermore, in a case where the connection for communication between the first remote controller 100A and the tractor 1 recovers, the first remote icon RA will also be displayed in solid line and transition to the state of being an active icon. Accordingly, it is possible to select not only the second remote controller 100B but also the first remote controller 100A as the terminal capable of resuming driving.

<Operations, Functions, Etc.>

Next, with reference to FIG. 3 to FIG. 13 (especially the flowchart of FIG. 12 and the timing chart of FIG. 13), the operations (functions) of the tablet 70 and the remote controllers 100 will be explained.

Note that, in the autonomous driving system of the present embodiment, as described above, the one tablet 70 and the two remote controllers 100A and 100B are used for performing a remote operation of the tractor 1. However, regarding these two remote controllers, as explained in above-described Example 1 and Example 2, in a case where the remote controllers 100 and the tractor 1 are connected for communication, the remote controllers 100 can be selected as the terminal capable of resuming driving by use of the tablet 70. Therefore, here, the setting state of the sixth stage ST2$f$ in Example 2 above as illustrated in FIG. 10 is displayed, and it is assumed that the first remote controller 100A is the terminal capable of resuming driving.

Further, in the present embodiment, the autonomous driving control device 51 of the tractor 1 stores the remote controllers 100 in an identifiable manner at the time of pairing registration. Therefore, it is configured so that whether the signal of the resuming operation is output to the tractor 1 by any one of the remote controllers 100 can be determined. Accordingly, it is also possible that a unique fail-safe system different from the tablet 70 side functions, so that the resuming can be performed only by the remote controller that lastly performed the temporary stop operation (remote controller that performed the last stop operation). Therefore, even if neither one of the remote controllers is selected as the driving remote controller on the tablet 70 side, it is possible to avoid such a situation of losing control due to interference of different operations caused by the two remote controllers 100A and 100B simultaneously performing different operations.

Note that the one tablet 70 and the two remote controllers 100 are configured to execute communication with the tractor 1 by wireless communication networks having different communication methods, respectively. Further, as described above, the tablet 70 includes the display 71 that can be operated via a touch panel. On the other hand, each remote controller 100 is equipped with the temporary stop button 120 that temporarily stops autonomous driving of the tractor 1, the emergency stop button 110 that emergently stops autonomous driving of the tractor 1 at an emergency, and the notification part 130 (light emission part 130$a$ and audio output part 130$b$) which is a means for allowing the operator of the remote controller to check the current driving state of the tractor 1 after a temporary stop or an emergent stop.

Therefore, according to the present embodiment, the operation of resuming the driving of the stopped tractor 1 can be performed in such a procedure explained below. Note that, in this case, one remote control terminal is designated by the above-described method, so that the three kinds of remote control terminals, i.e., the tablet 70 and the two remote controllers 100, provide different instructions (so as not to cause interference of different operations) to the tractor 1. Note that, here, it is assumed that the first remote controller 100A is set as the terminal capable of performing remote operations.

Figure 13:
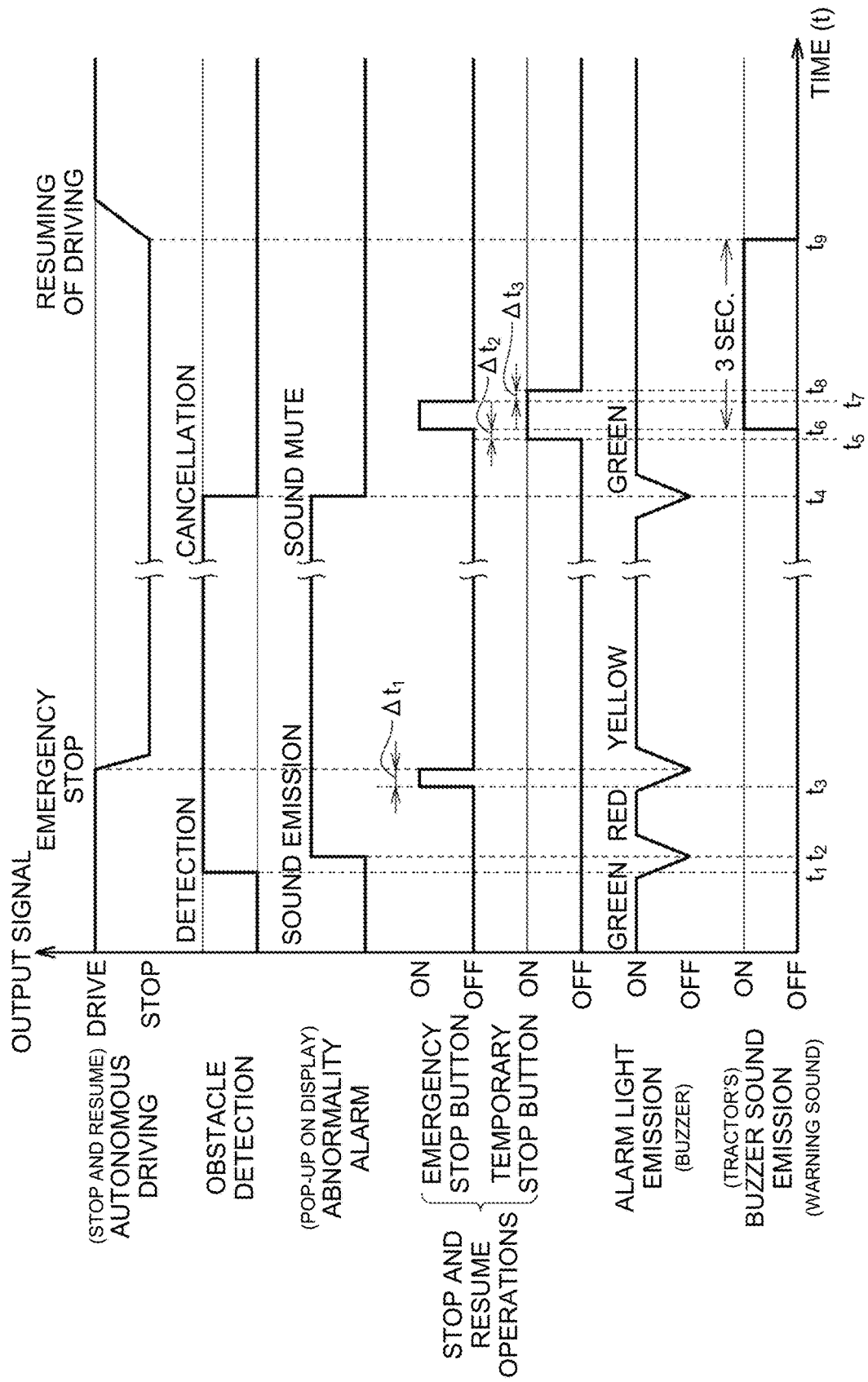
FIG. 13 is a timing chart illustrating the behavior in the operation of resuming the tractor in the first embodiment of the present invention.

Further, in this embodiment, regarding the procedure of detection of an obstacle, a detailed explanation is omitted and a brief explanation will be given so as not to deviate from the present invention. That is, if there is an obstacle by any chance, the obstacle will be detected at such a timing as illustrated in FIG. 13, i.e., the time t1, and a notification of abnormality will be given to the tablet 70 at the time t2 which is immediately after that. Further, at the same time t2, the light emission part 130$a$ and the audio output part 130$b$ of the first remote controller 100A will operate, and the red color lamp lights up (or blinks) and the buzzer or the like emits sound for a notification. Furthermore, at the time t4, in a case where the abnormal state is resolved, the notification behavior with the tablet 70 and the remote controller 100 will end. Then, the first remote controller 100A will have the light emission part 130$a$ emit light in green color and return to the original state (state capable of resuming).

Figure 12:
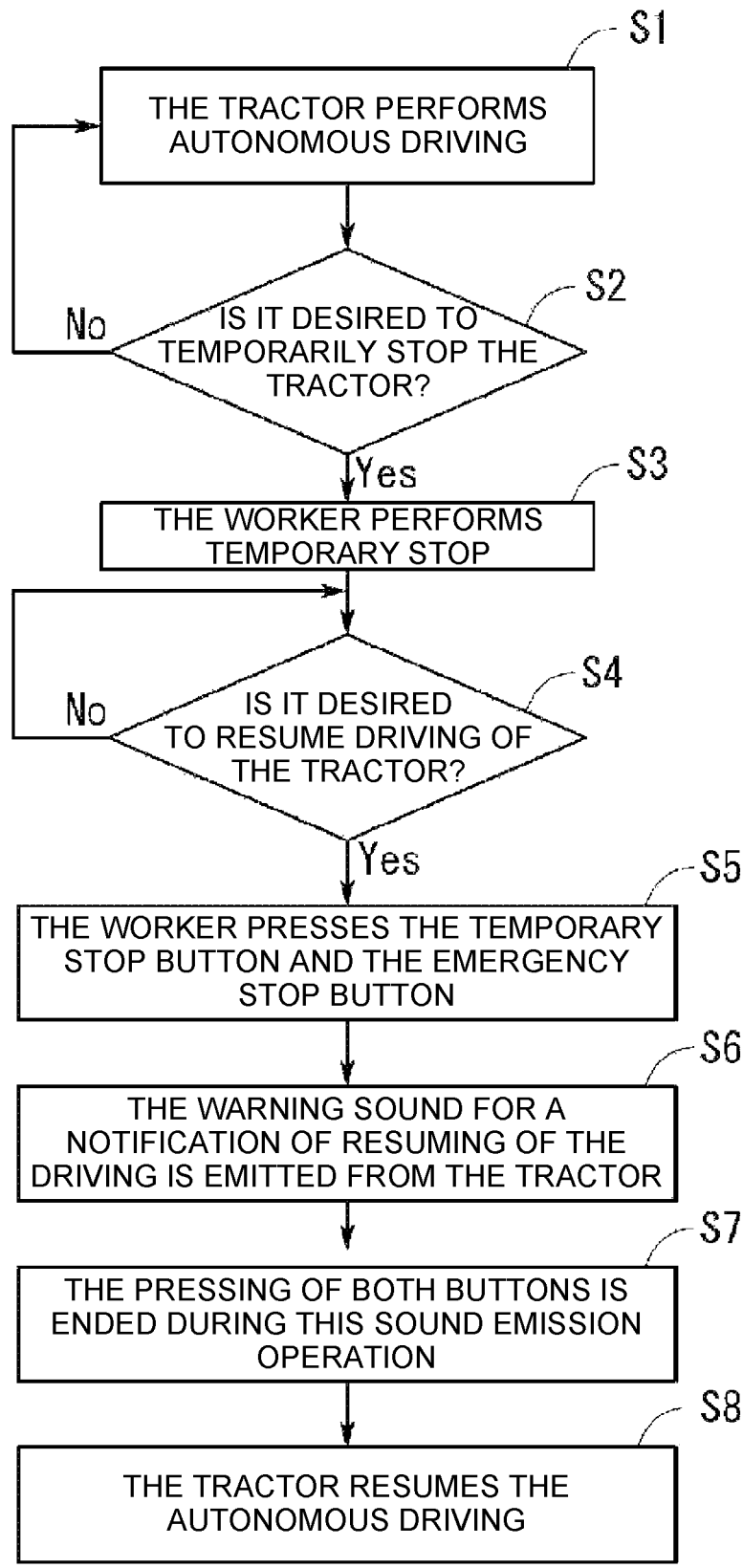
FIG. 12 is a flowchart illustrating a procedure of the operation of resuming the tractor in the first embodiment of the present invention.

At first, if there is no obstacle for the tractor 1 during driving and working, the tractor 1 which is a work vehicle normally performs autonomous driving in FIG. 12 and FIG. 13, for example (first step S1).

Then, while the tractor 1 is driving, a decision as to whether it needs to be stopped is made at all times (second step S2).

Then, in this second step S2, when the operator decides to temporarily stop the tractor 1, the procedure goes to the third step S3. Note that, in the second step S2, if the temporary stop is not performed, the procedure returns to the first step S1.

In this third step S3, for example, since the first remote controller 100A is selected and set as the terminal capable of performing a remote operation in advance, the operation can be performed only by this first remote controller 100A. Accordingly, by providing the operation of pressing the temporary stop button 120 of the first remote controller 100A, the driving tractor 1 can be stopped immediately.

Next, the operator or the like who performed the temporary stop decides to resume the driving of the tractor 1 (fourth step S4). Here, if the resuming of the driving is not desired, the procedure returns to the fourth step S4 again.

On the other hand, in a case where the resuming of the driving of the temporarily-stopped tractor 1 is to be performed, the operator of the first remote controller 100A can perform the operation of resuming the driving. That is, at the time t5, the temporary stop button 120 of the first remote controller 100A is pressed, and, almost without a delay (after the minute time Δt2 has elapsed), the emergency stop button 110 is pressed at the time t6 (fifth step S5). Note that, in this case, the resuming of the driving cannot be executed by the second remote controller 100B, which did not perform the stop operation.

Accordingly, since the operation of resuming driving is started after the temporary stop of the tractor 1 which is a work vehicle, at the time t6, prior to the resuming of the driving, the warning sound such as a loud buzzer sound for notifying (alarming) the workers around the tractor 1 that the resuming behavior will be started soon will be emitted from the tractor 1 for only three seconds (sixth step S6).

That is, within the period of time of the sound emission, i.e., the time t7, the operator of the first remote controller 100A who hears the alarm sound of this tractor 1 releases the pressing of the emergency stop button 110 of the first remote controller 100A, and, at the same time or almost the same time (after the minute time Δt3 has elapsed), i.e., the time t8, the operator also releases the operation of pressing the temporary stop button 120 (seventh step S7).

Note that, as for the operations of releasing the pressing of the two buttons here, for example, in a case where only the operation of pressing the emergency stop button 110 is released during the time of the sound emission of the warning sound for about three seconds, the tractor 1 will be in the temporary stop state after the sound emission of the warning sound ends. On the other hand, conversely, if only the emergency stop button 110 is continuously pressed and held, the tractor 1 will remain in the emergency stop state even after the sound emission of the warning sound ends.

Accordingly, at the time t9, the autonomous driving of the tractor 1 in the temporary stop can be resumed (eighth step S8).

In this way, the remote controller 100 resumes the driving of the tractor 1 in a case of performing a driving resuming operation in which, after the tractor 1 temporarily stops in response to a temporary stop operation performed to the temporary stop button 120, both emergency stop button 110 and temporary stop button 120 will be in the pressing state for the first predetermined period of time. Further, in a case where both emergency stop button 110 and temporary stop button 120 have been in the pressed state, the remote controller 100 makes the sound emission part 57 of the tractor 1 emit a buzzer sound (warning sound), which indicates that the driving of the tractor 1 will be resumed, for the second predetermined period of time (e.g., three seconds), and, in a case where the respective pressing operations on the emergency stop button 110 and temporary stop button 120 are both released within the second predetermined period of time, the remote controller 100 resumes driving of the tractor 1.

Note that it is also possible that the remote controller 100 resumes the driving of the tractor 1 in a case where the driving resuming operation is performed after the tractor 1 emergently stops in response to the emergency stop operation performed to the emergency stop button 110.

<Effects>

Therefore, in the present embodiment, since the tablet 70 and the remote controllers 100 respectively execute wireless communications with the tractor 1 via wireless communication networks having communication methods different from each other, the multiple wireless communication networks function as a fail safe, so that the safety is improved. Further, it is possible to select appropriate communication methods according to the data capacity of the communication performed by the tablet 70 and the data capacity of the communication performed by the remote controllers 100.

Further, according to the present embodiment, it is possible for the operator to carry the remote controller 100 and thereby perform the emergency stop operation for the autonomously-driving tractor 1 by operating the emergency stop button 110 of either one of the two remote controllers 100 at an emergency. Further, for example, the operator who carries the tablet 70 and one of the remote controllers 100 can let another worker to have the other one of the remote controllers 100 so as to respectively use the tablet 70 and the remote controllers 100 in a flexible manner according to the situations.

Further, according to the present embodiment, on the display 71 (see FIG. 4A) of the tablet 70, the emergency stop button image 71A for stopping the autonomous driving of the tractor 1 is displayed in the upper right position, and the temporary stop button image (start button image) 71B of the tablet 70 is displayed at the opposite position with respect to the left and right direction in a slightly smaller size than the emergency stop button image 71A. Therefore, the emergency stop button image 71A and the temporary stop button image 71B can be simultaneously arranged together on the same display screen.

Therefore, when the operator wants to emergently stop the tractor 1, since he or she can instantly recognize the position of the emergency stop button image 71A without performing a bothersome operation to switch screens, for example, so that the delay of the emergency stop operation and erroneous operations can be prevented.

Further, according to the present embodiment, since the remote controllers 100 include the light emission part 130*a* and audio output part 130*b* as the notification part 130 that provides a notification of the state of the tractor 1, the state of the tractor 1 can be surely recognized on a real time basis even in a situation of being away from the autonomously-driving tractor 1, so that the safety in the driving of the tractor 1 can be significantly improved.

Further, according to the present embodiment, the operation of the emergency stop button image 71A on the tablet 70 is performed by pressing (touching) the display 71 of the touch panel type, even in a case where the operator does not have a feeling of providing a pressing (touching) operation, the emergency stop button 110 (see FIG. 6) of the remote controllers 100 can be firmly pressed. Therefore, if the operator uses the remote controllers 100, the operator can thereby certainly feel that the pressing operation is performed, and thus reliable operations can be performed. Note that, in this case, the operator can use either emergency stop button 110 on the remote controller 100 side or emergency stop button image 71A on the tablet 70 side for emergently stopping the tractor 1.

Note that, although the two remote controllers 100 are used in the present embodiment, it is possible to increase the number of remote controllers. Then, other than the operator monitoring the autonomously-driving tractor 1, a worker working in the same field may also carry the remote controller 100, so that thereby the state of the tractor 1 can be well recognized with the notification by the LED lamps of the light emission part 130*a* and the audio of the audio output part 130*b*. Moreover, since the emergency stop button 110 of the remote controller 100 can be operated at an emergency, the safety of the workers in the field can be significantly improved by improving the monitoring system of the autonomously-driving tractor 1.

Further, according to the present embodiment, as illustrated in FIG. 4B, for example, the "work information setting mode" illustrated in FIG. 8 can be set on the display 71 by operating the screen switch button 73A. By switching to the screen that is set as this work information setting mode, the work selection area WSA is formed in the lower part of the screen for selecting and setting the terminal capable of resuming, as described above, so that three kinds of icons, i.e., the tablet image T indicated by "Tablet", the first remote controller image RA indicated by "First remote", and the second remote controller image RB indicated by "Second remote", can be display, and thus it is convenient that the terminals can be easily changed and switched with a touching operation using a finger, etc.

Further, in the state where the rectangle display images F bordering the entire peripheries of the images so that the peripheries of the respective images are enclosed are enclosed are displayed in such an area in the display screen, operable launch states can be set and displayed with those icons, and thus the launching operation can be performed easily and quickly.

With the tablet 70 with such a configuration, it is possible for the operator to perform various kinds of operations while referring to and checking the information displayed on the touch panel of the tablet 70 (e.g., information of the field required for performing autonomous driving), and thus the risk that an erroneous operation occurs will be suppressed.

The automatic driving system according to the present embodiment described above can be specified as follows.

APPENDIX 1

An autonomous driving system equipped with a first remote control terminal that is capable of communicating with a work vehicle and generates a driving route of the work vehicle and executes driving control and one or more second remote control terminals that are capable of communicating with the work vehicle and execute driving control of the work vehicle, wherein the first remote control terminal includes a display control part that is capable of selecting either one of the first remote control terminal and the second remote control terminal to be allowed to resume the driving of the work vehicle, and the display control part displays only the second remote control terminals for which communication with the work vehicle has been established in a selectable manner.

The autonomous driving system according to Appendix 1 is an autonomous driving system equipped with a display screen that is capable of communicating with a work vehicle and capable of displaying various kinds of information, a first remote control terminal that generates a driving route of the work vehicle and executes driving control, and a plurality of second remote control terminals that are capable of communicating with the work vehicle and execute the driving control of the work vehicle, wherein the first remote control terminal includes a display control part that is capable of executing a work of selecting a "remote controllable terminal" to be capable of performing remote control from among the plurality of remote control terminals as for allowing any one of the first remote control terminal and the plurality of second remote control terminals to execute the driving resuming operation of the stopped work vehicle, and, on the display screen, the display control part is configured to display designated/selected one of the remote control terminals for which communication with the work vehicle has been established on the screen as the remote controllable terminal, which is capable of the driving resuming operation.

APPENDIX 2

The autonomous driving system according to Appendix 1, wherein the display control part changes the form of displaying the second remote control terminal in a case where the connection for communication between the work vehicle and the second remote control terminal is lost.

The autonomous driving system according to Appendix 2, wherein, in a case where the connection for communication between the work vehicle and any one of the second remote control terminals is lost, in order to make it possible to check the state thereof, the display control part is configured to change the form of displaying the second remote controllable terminal on the display screen of the first remote control terminal.

APPENDIX 3

The autonomous driving system according to Appendix 1 or 2, wherein the display control part stores the selected second remote control terminal in a case where the connection for communication between the selected second remote control terminal and the work vehicle is lost and then the connection for communication with the work vehicle recovers.

The autonomous driving system according to Appendix 3, wherein, in a case where the connection for communication between the selected second remote control terminal and the work vehicle is lost and then the connection for communication with the work vehicle recovers, the display control part stores the selection setting situation of the second remote controllable terminal which had been selected from among the second remote control terminals immediately before the connection for communication is lost.

APPENDIX 4

The autonomous driving system according to any one of Appendix 1 to 3, wherein, in a case where the second remote control terminal is selected, the display control part provides a notification that the second remote control terminal is allowed to resume the driving of the work vehicle.

The autonomous driving system according to Appendix 4, wherein, in a case where the second remote control terminal is selected, for confirmation that the driving of the work vehicle will be resumed by the second remote controllable terminal, the display control part notifies the second remote controllable terminal that the control of resuming the driving of the work vehicle is possible.

With the automatic driving system according to the present embodiment, since the display control part installed in the first remote control terminal is capable of displaying only the second remote control terminal for which communication with the work vehicle has been established out of the plurality of remote control terminals on the display screen as the remote controllable terminal which is capable of the driving resuming operation, it is possible to avoid occurrence of a situation in which remote control terminals perform operations that are different from each other in a case where a plurality of operators operate a plurality of remote control terminals for one work vehicle (interference of different operations), and thus the autonomous driving system with a high degree of safety can be realized.

Second Embodiment

Next, the second embodiment according to the present invention will be explained with reference to FIG. 14 to FIG. 16. In the present embodiment, the tractor 1 (main part thereof) and tablet 70 have the same configurations as those in the first embodiment, and thus the same symbols are used for the same parts to avoid duplicate explanations.

Figure 14:
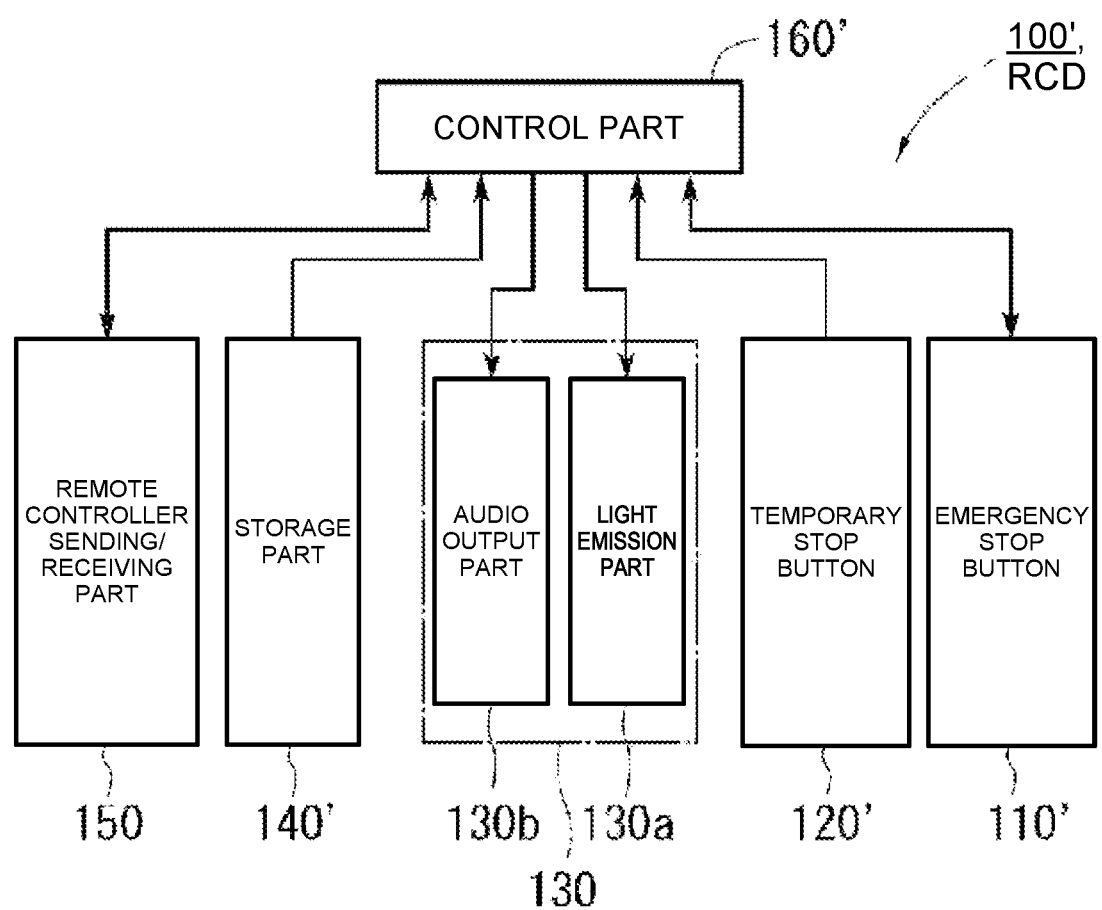
FIG. 14 is a configuration block diagram of the tablet according to the second embodiment of the present invention.

That is, the remote controller 100' illustrated in FIG. 14 of the present embodiment is configured to generate a driving resuming signal with the control part 160 by a long-press operation on the temporary stop button 120. Therefore, regarding the remote controller 100' illustrated in FIG. 14, the control part 160' of the components of the respective parts partially differs from the control part 160 of the remote controller 100 of the first embodiment illustrated in FIG. 7 in terms of their configurations. In addition, due to these configurations, the autonomous driving control device 51 on the tractor 1 side in the configuration block diagram illustrated in FIG. 3 is partially different so that, if a driving resuming signal which is generated by a long-press behavior on the temporary stop button 120' of the remote controller 100' is input, the driving of the temporarily-stopped tractor 1 will be resumed.

Note that, also in the autonomous driving system of the present embodiment, since the two remote controllers 100A and 100B are included to be usable as with the first embodiment, such a setting for only either one of these two remote controllers to be usable (launch remote controller) is provided as explained in the first embodiment in order to prevent interference of different operations. Note that, also in the present embodiment, such a setting for only the first remote controller 100A to be usable is performed on the tablet 70 side in advance.

Figure 15:
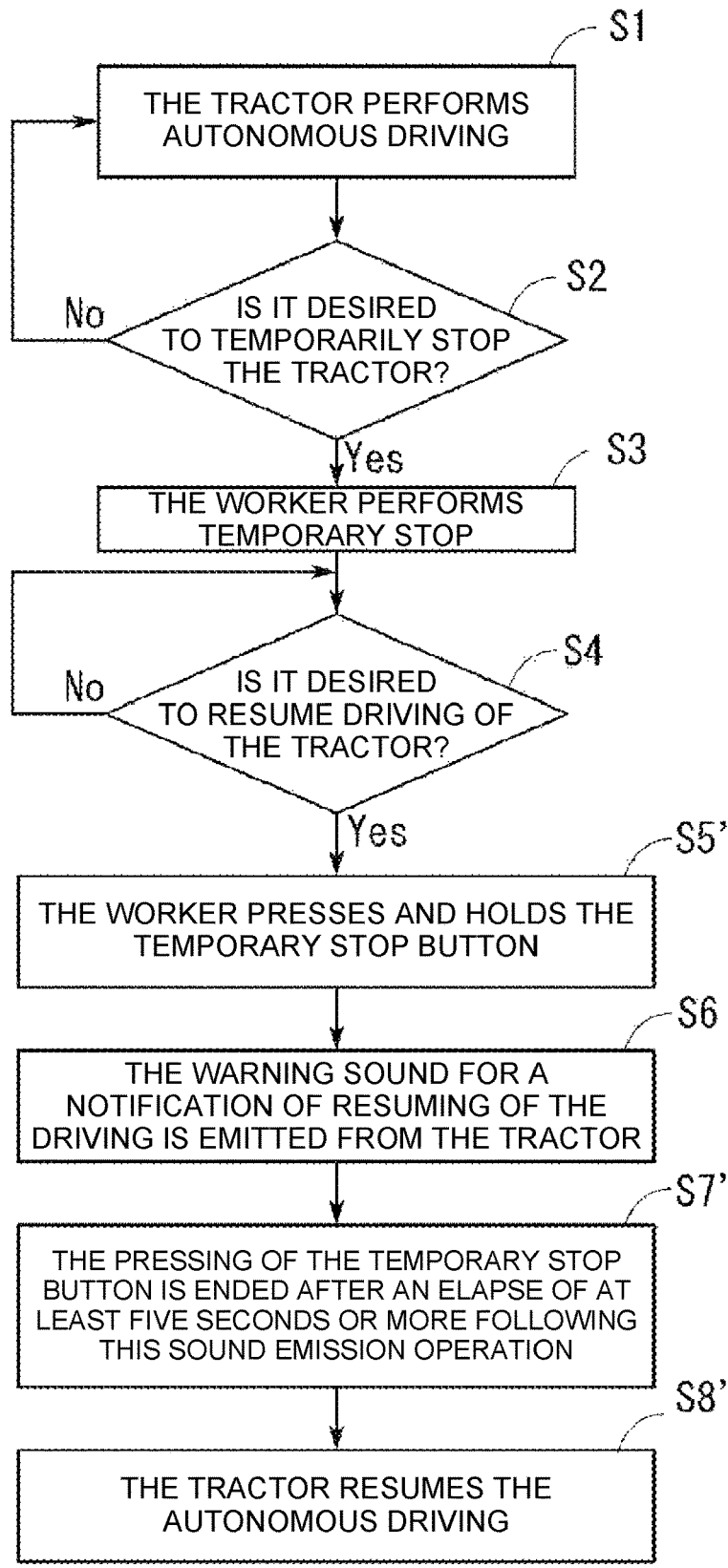
FIG. 15 is a flowchart illustrating a procedure of the operation of resuming the tractor according to the second embodiment of the present invention.

Therefore, according to the present embodiment, in the flowchart illustrated in FIG. 15 and the timing chart illustrated in FIG. 16, the fifth' step S5' and the seventh' step S7' and the emergency stop button 110', the temporary stop button 120', the storage part 140', and the control part 160' of the components of the remote controller 100 are different from those in the case of the first embodiment. Note that, regarding these emergency stop button 110', temporary stop button 120', storage part 140' and the control part 160', only the configurations related to the control of the resuming operation are different, and thus the detailed explanations will be omitted.

On the other hand, regarding the procedure of the resuming operation or the like, in a case where the resuming of the driving of the temporarily-stopped tractor 1 in the fifth' step S5', the operator of the first remote controller 100A, which performed the temporary stop (which is currently operable), can perform the operation of resuming driving. That is, in the time t5, the temporary stop button 120 of the first remote controller 100A is pressed to a long-pressed state for a predetermined period of time or more (e.g., five seconds or more).

Accordingly, since the operation of resuming driving is started after the temporary stop of the tractor 1, which is a work vehicle, at the time t6, prior to the resuming, the warning sound such as a buzzer sound notifying (alarming) the workers around the tractor 1 that the resuming behavior will be started soon will be emitted from the tractor 1 for only three seconds (sixth step S6). For example, upon the operation of pressing the temporary stop button 120 of the first remote controller 100A to a long-pressed state continuously for five seconds, the control part 160' outputs a sound emission instruction to the tractor 1, so that a buzzer sound will be emitted for three seconds from the sound emission part 57.

At the time t7 during the sound emission (e.g., for three seconds), i.e., at the time t7 after an elapse of at least five seconds or more from the time t5 at which the pressing of the button operation is started, the operator of the first remote controller 100A who hears the alarm sound of this tractor 1 releases the behavior of pressing the temporary stop button 120' of the first remote controller 100A (seventh step S7).

Accordingly, at the time t7, the autonomous driving of the tractor 1 in the temporary stop can be resumed (eighth step S8'). Note that, in a case where the temporary stop button 120 is kept being pressed for a predetermined period of time or more in this eighth' step S8', the tractor 1 will not resume the driving behavior and become the temporarily-stopped state when a predetermined period of time elapses after the end of the sound emission of the alarming sound, which is a notification of starting of the driving.

Note that the second step S2 to the fourth step S4 are the same as in the previous first embodiment, so the explanations thereof will be omitted.

As described above, the remote controller 100' of the present embodiment provides driving-related instructions to the tractor 1 that is capable of autonomous driving. Further, the remote controller 100' outputs a driving resuming signal to the tractor 1 so as to resume the driving of the tractor 1 in a case where, after the tractor 1 temporarily stops in response to a temporary stop operation performed to the temporary stop button 120, the driving resuming operation which includes the pressing operation which is to continuously press the temporary stop button 120' for the first predetermined period of time (e.g., five seconds) and the release operation which is to release the pressing operation performed to the temporary stop button 120 within the second predetermined period of time (e.g., three seconds) that follows the first predetermined period of time. Accordingly, since there is no need that the switch for resuming the driving of the stopped tractor 1 is separately installed, the remote controller 100' can be downsized. Thus, it is possible to downsize the remote control terminal (remote controller 100 or 100') which provides instructions related to driving to the tractor 1 capable of autonomous driving and to realize the autonomous driving system in which, in a case where the tractor 1 stops, the driving of the tractor 1 can be resumed by the remote control terminal.

Further, in a case where the tractor 1 temporarily stops in response to the temporary stop operation performed on the temporary stop button 120' and then the operation of continuously pressing the temporary stop button 120' for the predetermined period of time or more, the remote controller 100' causes the sound emission part 57 of the tractor 1 to emit the buzzer sound (warning sound), which indicates that the driving of the tractor 1 will be resumed, for the second predetermined period of time. Accordingly, prior to the resuming of driving, it is possible to notify the workers around the tractor 1 that the behavior of resuming driving will be started soon, and the user of the remote controller 100' can know that the operation of resuming driving has been enabled.

Note that, in the above-described first embodiment and second embodiment, it is also possible that the driving of the tractor 1 is resumed by the remote controller 100 in a case where the driving resuming operation is performed after the tractor 1 emergently stops in response to the emergency stop operation performed on the emergency stop button 110.

Further, in the above-described first embodiment and second embodiment, it is also possible that the tractor 1 is configured to resume driving in a case where the function of the obstacle sensor 36 (obstacle detection part) is enabled (or normal) and not to resume driving in a case where the function of the obstacle sensor 36 is disabled (or abnormal), As described above, if the tractor 1 is configured to resume driving only in a case where the obstacle sensor 36 is normally operating, it is thereby possible to prevent resuming of driving that is not intended by the users.

The present invention is not limited to the above-described embodiments and can be embodied in various forms. The configurations of the respective parts are not limited to those in the embodiments illustrated in the drawings, and various modifications can be made without departing from the gist of the present invention.

The invention claimed is:

1. An autonomous driving system comprising a remote control terminal that provides an instruction related to driving to a work vehicle capable of autonomous driving, the remote control terminal including:
    a switch part that accepts a stop operation which is to stop the work vehicle during the autonomous driving; and
    a control part that resumes the driving of the work vehicle in a case where, after the work vehicle stops in response to the stop operation performed to the switch part, a driving resuming operation, which includes a pressing operation which is to continuously press the switch part for a first predetermined period of time or more and a release operation which is to release the pressing operation performed to the switch part within a second predetermined period of time that follows the first predetermined period of time, is performed.

2. The autonomous driving system according to claim 1, wherein the switch part includes a first switch part that accepts an emergency stop operation, which is to emergently stop the work vehicle during the autonomous driving, and a second switch part that accepts a temporary stop operation, which is to temporarily stop the work vehicle during the autonomous driving, and the control part resumes the driving of the work vehicle in a case where, after the work vehicle temporarily stops in response to the temporary stop operation performed to the second switch part, the driving resuming operation, which includes the pressing operation which is to continuously press the second switch part for the first predetermined period of time or more and the release operation which is to release the pressing operation performed to the second switch part within the second predetermined period of time, is performed.

3. The autonomous driving system according to claim 2, wherein the work vehicle includes a sound emission part that emits a predetermined sound, and the control part causes the sound emission part to emit a sound indicating that the driving of the work vehicle will be resumed, for the second predetermined period of time, in a case where, after the work vehicle temporarily stops in response to the temporary stop operation performed to the second switch part, the pressing operation is continuously performed to the second switch part for the first predetermined period of time or more.

4. The autonomous driving system according to claim 1, wherein the autonomous driving system comprises a plurality of the remote control terminals, and the work vehicle resumes the driving only in a case of obtaining a driving resuming instruction from a remote control terminal that stopped the work vehicle out of the plurality of the remote control terminals.

5. The autonomous driving system according to claim 1, wherein the work vehicle includes an obstacle detection part that detects an obstacle, and the work vehicle resumes the driving in a case where a function of the obstacle detection part is enabled and does not resume the driving in a case where the function of the obstacle detection part is disabled.

6. The autonomous driving system according to claim 1, wherein the remote control terminal includes a light emission part that emits light in a plurality of forms of light emission and an audio output part that emits a sound in a plurality of sound forms, and, in a case where the work vehicle stops in response to the stop operation, the control part causes the light emission part to light up in a first color and causes the audio output part to output a first sound in a case where the resuming of the driving of the work vehicle is impossible, and the control part causes the light emission part to light up in a second color and causes the audio output part to output a second sound in a case where the resuming of the driving of the work vehicle is possible.

7. An autonomous driving system comprising a remote control terminal that provides an instruction related to driving to a work vehicle capable of autonomous driving, the remote control terminal including:

a first switch part that accepts an emergency stop operation which is to emergently stop the work vehicle during the autonomous driving;

a second switch part that accepts a temporary stop operation which is to temporarily stop the work vehicle during the autonomous driving; and a control part that resumes the driving of the work vehicle in a case where, after the work vehicle stops in response to a stop operation performed to the first switch part or the second switch part, a driving resuming operation in which the first switch part and the second switch part are both in a pressed state for a first predetermined period of time is performed.

8. The autonomous driving system according to claim 7, wherein the work vehicle includes a sound emission part that emits a predetermined sound, the control part causes the sound emission part to emit a sound indicating that the driving of the work vehicle will be resumed, for a second predetermined period of time, in a case where the first switch part and the second switch part are both in the pressed state, and the control part resumes the driving of the work vehicle in a case where pressing operations respectively performed to the first switch part and the second switch part are both released within the second predetermined period of time.

* * * * *